US011422669B1

(12) United States Patent
Ravasz et al.

(10) Patent No.: US 11,422,669 B1
(45) Date of Patent: Aug. 23, 2022

(54) DETECTING INPUT USING A STYLUS IN ARTIFICIAL REALITY SYSTEMS BASED ON A STYLUS MOVEMENT AFTER A STYLUS SELECTION ACTION

(71) Applicant: Facebook Technologies, LLC, Menlo Park, CA (US)

(72) Inventors: Jonathan Ravasz, London (GB); Jasper Stevens, London (GB); Adam Tibor Varga, London (GB); Etienne Pinchon, London (GB); Simon Charles Tickner, Canterbury (GB); Jennifer Lynn Spurlock, Seattle, WA (US); Kyle Eric Sorge-Toomey, Seattle, WA (US); Robert Ellis, London (GB); Barrett Fox, Berkeley, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/435,110

(22) Filed: Jun. 7, 2019

(51) Int. Cl.
*G06F 3/04815* (2022.01)
*G06F 3/0354* (2013.01)
(Continued)

(52) U.S. Cl.
CPC ....... *G06F 3/04815* (2013.01); *G02B 27/017* (2013.01); *G06F 3/017* (2013.01);
(Continued)

(58) Field of Classification Search
CPC ............... G06F 3/04815; G06F 3/0482; G06F 3/03545; G06F 3/017; G02B 27/017; G06K 9/00335
See application file for complete search history.

(56) References Cited

U.S. PATENT DOCUMENTS

| 8,402,391 | B1 * | 3/2013 | Doray | G06F 3/04883 715/834 |
| 8,884,876 | B2 * | 11/2014 | Song | G06F 3/03545 345/158 |

(Continued)

OTHER PUBLICATIONS

U.S. Appl. No. 16/435,116, by Ravasz et al., filed Jun. 7, 2019.
(Continued)

*Primary Examiner* — Matthew Ell
*Assistant Examiner* — Kenny Nguyen
(74) *Attorney, Agent, or Firm* — Shumaker & Sieffert, P.A.

(57) ABSTRACT

An artificial reality system is described that renders, presents, and controls user interface elements within an artificial reality environment, and performs actions in response to one or more detected gestures of the user. In one example, an artificial reality system comprises a head-mounted display configured to output artificial reality content; a stylus; a stylus action detector configured to detect movement of the stylus, detect a stylus selection action, and after detecting the stylus selection action, detect further movement of the stylus; a UI engine configured to generate stylus movement content in response to detecting movement of the stylus, and generate a UI input element in response to detecting the stylus selection action; and a rendering engine configured to render the stylus movement content and the UI input element as overlays to the artificial reality content, and update the stylus movement content based on the further movement of the stylus.

19 Claims, 27 Drawing Sheets

(51) Int. Cl.
    *G02B 27/01*         (2006.01)
    *G06F 3/0482*      (2013.01)
    *G06F 3/01*          (2006.01)
    *G06V 40/20*       (2022.01)

(52) U.S. Cl.
    CPC ........ *G06F 3/03545* (2013.01); *G06F 3/0482* (2013.01); *G06V 40/20* (2022.01)

(56) References Cited

U.S. PATENT DOCUMENTS

| | | | |
|---|---|---|---|
| 9,323,422 B2* | 4/2016 | Song | G06F 3/0482 |
| 10,168,789 B1 | 1/2019 | Soto et al. | |
| 10,261,595 B1 | 4/2019 | Kin | |
| 10,489,978 B2* | 11/2019 | Dimitrov | G06T 19/006 |
| 10,930,075 B2* | 2/2021 | Costa | G06T 11/203 |
| 10,937,215 B1* | 3/2021 | Iskandar | G06T 11/60 |
| 11,194,438 B2* | 12/2021 | Boesel | G02B 27/0172 |
| 2010/0103101 A1* | 4/2010 | Song | G06F 3/03542 345/158 |
| 2010/0103167 A1* | 4/2010 | Song | G06F 3/03545 345/419 |
| 2010/0103178 A1* | 4/2010 | Song | G06F 3/03545 345/473 |
| 2011/0164029 A1 | 7/2011 | King et al. | |
| 2011/0228078 A1 | 9/2011 | Chen et al. | |
| 2012/0249741 A1 | 10/2012 | Maciocci et al. | |
| 2013/0069985 A1 | 3/2013 | Wong et al. | |
| 2014/0028716 A1 | 1/2014 | Yeh | |
| 2014/0062854 A1 | 3/2014 | Cho | |
| 2014/0152623 A1* | 6/2014 | Lee | G06F 3/03545 345/175 |
| 2014/0210797 A1* | 7/2014 | Kreek | G06F 3/03545 345/179 |
| 2014/0267078 A1* | 9/2014 | Kukulski | G06F 3/03545 345/173 |
| 2014/0279242 A1 | 9/2014 | Staicut et al. | |
| 2014/0282275 A1 | 9/2014 | Everitt et al. | |
| 2014/0320408 A1* | 10/2014 | Zagorsek | G06F 3/017 345/158 |
| 2015/0040040 A1 | 2/2015 | Balan et al. | |
| 2015/0070332 A1* | 3/2015 | Lee | G06F 3/0418 345/179 |
| 2015/0106767 A1 | 4/2015 | Abercrombie et al. | |
| 2015/0331576 A1* | 11/2015 | Piya | G06F 3/04815 715/850 |
| 2016/0054851 A1* | 2/2016 | Kim | G06F 3/04186 345/174 |
| 2016/0231833 A1* | 8/2016 | Gu | G06F 3/03545 |
| 2016/0306431 A1 | 10/2016 | Stafford et al. | |
| 2016/0370971 A1* | 12/2016 | Hackett | G06T 11/001 |
| 2017/0220119 A1 | 8/2017 | Potts et al. | |
| 2017/0263056 A1 | 9/2017 | Leppanen et al. | |
| 2017/0329419 A1* | 11/2017 | Dearman | G06F 3/04842 |
| 2018/0033204 A1* | 2/2018 | Dimitrov | G06T 15/20 |
| 2018/0046245 A1 | 2/2018 | Schwarz et al. | |
| 2018/0081456 A1* | 3/2018 | Li | G06F 3/03545 |
| 2018/0181245 A1* | 6/2018 | Beck | G06N 20/00 |
| 2018/0364808 A1 | 12/2018 | Pahud et al. | |
| 2019/0065026 A1* | 2/2019 | Kiemele | G06F 3/04815 |
| 2019/0114835 A1* | 4/2019 | Costa | G06F 3/017 |
| 2019/0369752 A1* | 12/2019 | Ikeda | G06F 3/017 |

OTHER PUBLICATIONS

Office Action from U.S. Appl. No. 16/435,116, dated Feb. 7, 2020, 19 pp.
Response to Office Action dated Feb. 7, 2020, from U.S. Appl. No. 16/435,116, filed May 7, 2020, 10 pp.
Final Office Action from U.S. Appl. No. 16/435,116, dated Jun. 2, 2020, 17 pp.
Response to Final Office Action dated Jun. 2, 2020, from U.S. Appl. No. 16/435,116, filed Aug. 25, 2020, 8 pp.
Final Office Action from U.S. Appl. No. 16/435,116, dated Jun. 17, 2021, 16 pp.
Office Action from U.S. Appl. No. 16/435,116, dated Feb. 19, 2021, 15 pp.
Response to Office Action dated Feb. 19, 2021, from U.S. Appl. No. 16/435,116, filed May 19, 2021, 9 pp.
International Search Report and Written Opinion for International Application No. PCT/US2020/035384, dated Sep. 7, 2020, 10 Pages.
Response to Final Office Action dated Jun. 17, from U.S. Appl. No. 16/435,116, filed Aug. 12, 2021, 10 pp.
Advisory Action dated Aug. 27, 2021 for U.S. Appl. No. 16/435,116, filed Jun. 7, 2019, 3 pages.
Notice of Allowance from U.S. Appl. No. 16/435,116, dated Jan. 12, 2022, 18 pp.

* cited by examiner

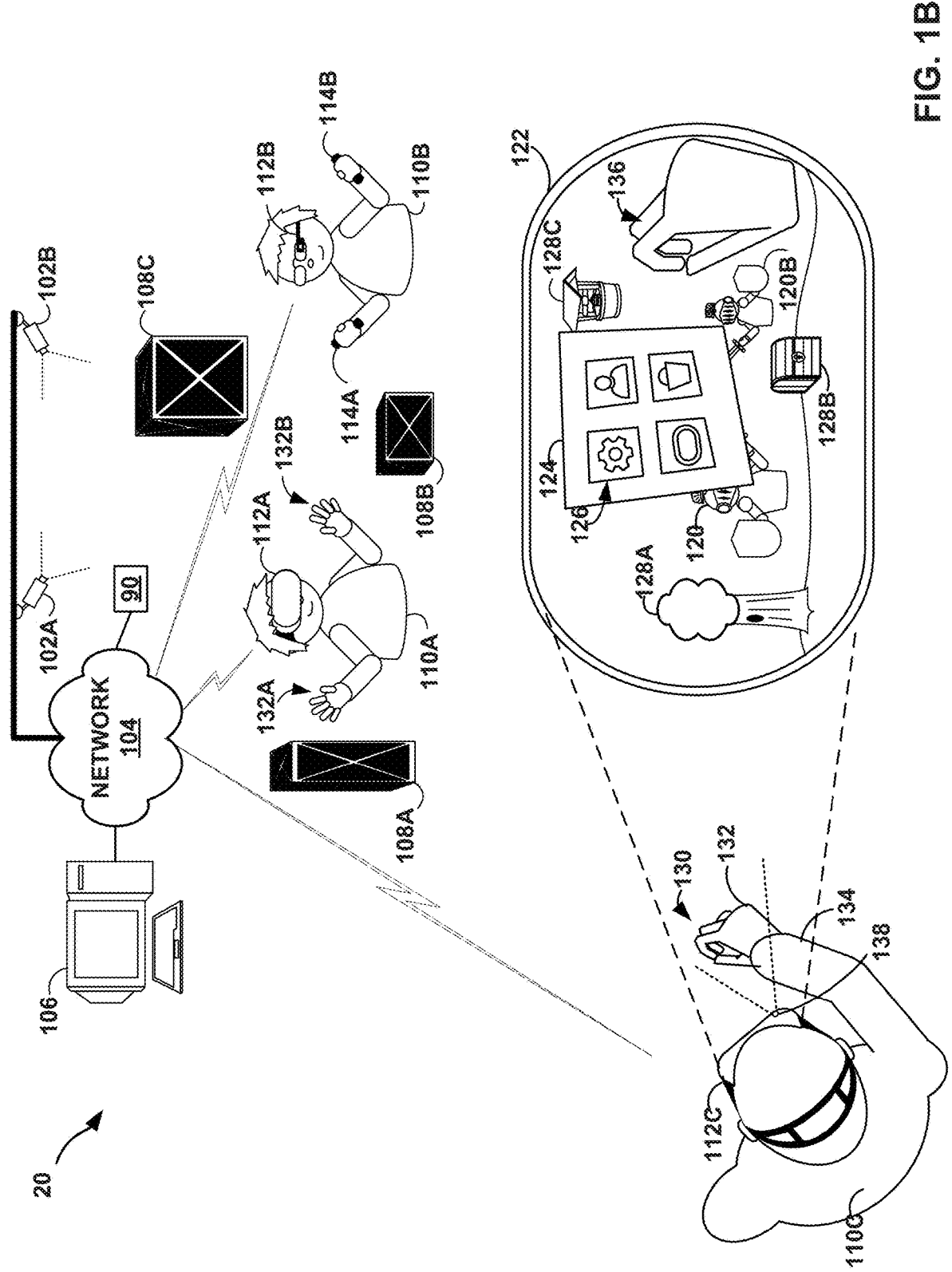

DETECTING INPUT USING A STYLUS IN ARTIFICIAL REALITY SYSTEMS BASED ON A STYLUS MOVEMENT AFTER A STYLUS SELECTION ACTION

TECHNICAL FIELD

This disclosure generally relates to artificial reality systems, such as virtual reality, mixed reality and/or augmented reality systems, and more particularly, to user interfaces of artificial reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include completely-generated content or generated content combined with captured content (e.g., real-world video and/or images). During operation, the user typically interacts with the artificial reality system to select content, launch applications or otherwise configure the system.

SUMMARY

In general, this disclosure describes artificial reality systems and, more specifically, graphical user interface elements and techniques for presenting and controlling the user interface elements within an artificial reality environment.

For example, artificial reality systems are described that generate and render graphical user interface elements for display to a user in response to detection of one or more pre-defined gestures by the user, such as particular motions, configurations, positions, and/or orientations of the user's hands, fingers, thumbs or arms, or a combination of pre-defined gestures. In some examples, the artificial reality system may further trigger generation and rendering of the graphical user interface elements in response to detection of particular gestures in combination with other conditions, such as the position and orientation of the particular gestures in a physical environment relative to a current field of view of the user, which may be determined by real-time gaze tracking of the user, or relative to a pose of an HMD worn by the user.

In some examples, the artificial reality system may generate and present the graphical user interface elements as overlay elements with respect to the artificial reality content currently being rendered within the display of the artificial reality system. The graphical user interface elements may, for example, be a graphical user interface, such as a menu or sub-menu with which the user interacts to operate the artificial reality system, or individual graphical user interface elements selectable and manipulatable by a user, such as toggle elements, drop-down elements, menu selection elements, two-dimensional or three-dimensional shapes, graphical input keys or keyboards, content display windows and the like.

This disclosure describes techniques for recognizing an interaction by a hand of a user with a user interface element, such as a user interface (UI) pinch element, and in response to such interaction, triggering or gating the presentation of a graphical user interface element. In some examples, a user may interact with such a UI pinch element through a gesture or movement that may include two fingers of a hand being brought together and/or forming a pinching configuration in the vicinity of the UI pinch element, followed by a subsequent pulling motion of the hand and/or fingers while the hand is in the pinching configuration. In some examples, the triggering or gating of the presentation of the graphical user interface element may be in response to recognizing or detecting a specific action or movement performed by a user's hand when controlling a physical stylus.

In some examples, the graphical user interface element presented in response to the pinch and pull gesture (or in response to a stylus action) may present options for specifying input, where that input may be specified by a user for the purpose of making an adjustment to one or more aspects of the artificial reality environment. Further movements by the user, after the graphical user interface element is presented, may cause the artificial reality system to modify the appearance of the graphical user interface element to indicate the effect that the adjustment, if selected, may have on the artificial reality environment. In some examples, an additional gesture or movement causes the artificial reality system to identify a user's selected input for adjustment or option presented by the graphical user interface element, and upon such selection, apply that input to the artificial reality environment.

Some of the techniques of this disclosure may provide specific technical improvements and advantages. For example, at least some of the gestures and/or movements described herein may provide a sense of tactile feedback or haptic (i.e., "self-haptic") feedback, which satisfies some users' expectation for some sense of physical feedback when interacting with UI elements. Further, at least some of the gestures and/or movements described herein may be natural movements capable of being performed with only a single hand, and without much physical difficulty for many users. In addition, such gestures and/or movements may be capable of being reliably tracked and/or recognized by an HMD or by other sensors or image capture devices, since such gestures and/or movements might be easy to identify from image data, and images of the gestures and/or movements may be less susceptible to being obscured or occluded by other physical elements (e.g., the user's other hand) within the physical environment.

This disclosure primarily describes operations performed by an artificial reality system in accordance with one or more aspects of this disclosure. In one specific example, this disclosure describes a method comprising capturing, by an image capture device, image data representative of a physical environment; outputting, by a HMD, artificial reality content; identifying, from the image data, a gesture comprising a motion of two fingers from a hand to form a pinching configuration and a subsequent pulling motion while in the pinching configuration; generating a UI input element in response to identifying the gesture; and rendering the UI input element as an overlay to at least some of the artificial reality content.

In another specific example, this disclosure describes a method comprising outputting artificial reality content; detecting movement of a stylus; detecting a stylus selection action; after detecting the stylus selection action, detecting further movement of the stylus; generating stylus movement content in response to detecting movement of the stylus; generating a UI input element in response to detecting the stylus selection action; rendering the stylus movement content and the UI input element as overlays to at least some of the artificial reality content; and updating the stylus movement content based on the further movement of the stylus.

In another specific example, this disclosure describes a method capturing, by an image capture device, image data representative of a physical environment; outputting, by a head-mounted display (HMD), artificial reality content; identifying, from the image data, a gesture comprising a motion of two fingers from a hand to form a pinching configuration and a subsequent pulling motion while in the pinching configuration; generating a UI input element in response to identifying the gesture; and rendering the UI input element as an overlay to at least some of the artificial reality content.

In another specific example, this disclosure describes a non-transitory computer-readable medium comprising instructions for causing one or more processors of an artificial reality system to perform operations comprising: capturing, by an image capture device, image data representative of a physical environment; outputting, by a head-mounted display (HMD), artificial reality content; identifying, from the image data, a gesture comprising a motion of two fingers from a hand to form a pinching configuration and a subsequent pulling motion while in the pinching configuration; generating a UI input element in response to identifying the gesture; and rendering the UI input element as an overlay to at least some of the artificial reality content.

In another specific example, this disclosure describes outputting artificial reality content; detecting movement of a stylus; detecting a stylus selection action; after detecting the stylus selection action, detecting further movement of the stylus; generating stylus movement content in response to detecting movement of the stylus; generating a UI input element in response to detecting the stylus selection action; rendering the stylus movement content and the UI input element as overlays to at least some of the artificial reality content; and updating the stylus movement content based on the further movement of the stylus.

In another specific example, this disclosure describes a non-transitory computer-readable medium comprising instructions for causing one or more processors of an artificial reality system to perform operations comprising: outputting artificial reality content; detecting movement of a stylus; detecting a stylus selection action; after detecting the stylus selection action, detecting further movement of the stylus; generating stylus movement content in response to detecting movement of the stylus; generating a UI input element in response to detecting the stylus selection action; rendering the stylus movement content and the UI input element as overlays to at least some of the artificial reality content; and updating the stylus movement content based on the further movement of the stylus.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 1B is an illustration depicting another example artificial reality system in accordance with the techniques of the disclosure.

DETAILED DESCRIPTION

Figure 1A:
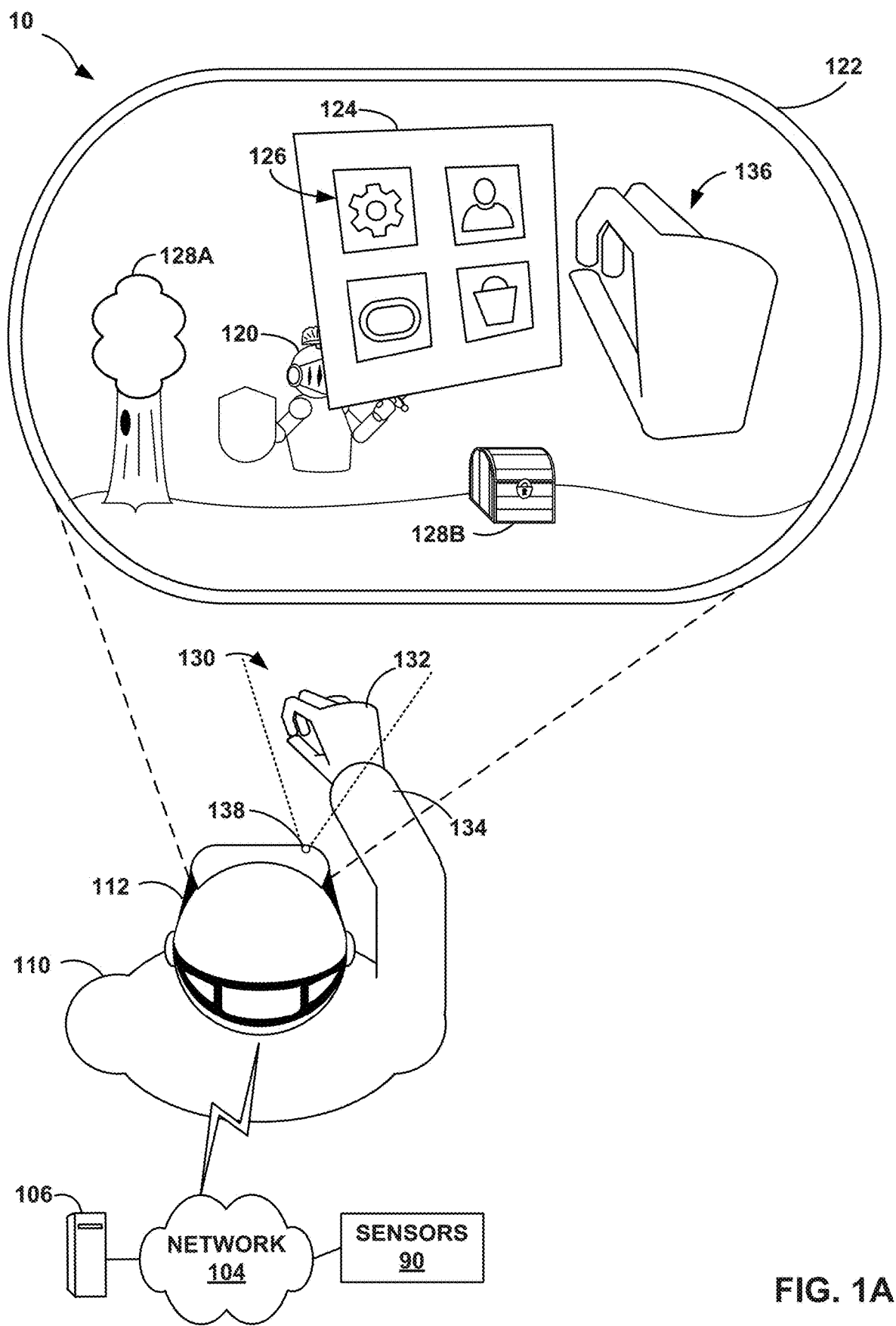
FIG. 1A is an illustration depicting an example artificial reality system that presents and controls user interface elements within an artificial reality environment in accordance with the techniques of the disclosure.

FIG. 1A is an illustration depicting an example artificial reality system 10 that presents and controls user interface elements within an artificial reality environment in accordance with the techniques of the disclosure. In some example implementations, artificial reality system 10 generates and renders graphical user interface elements to a user 110 in response to one or more detected gestures performed by user 110. That is, as described herein, artificial reality system 10 presents one or more graphical user interface elements 124, 126 in response to detecting one or more particular gestures performed by user 110, such as particular motions, configurations, locations, and/or orientations of the user's hands, fingers, thumbs or arms. In other examples, artificial reality system 10 presents and controls user interface elements specifically designed for user interaction and manipulation within an artificial reality environment, such as specialized toggle elements, drop-down elements, menu selection elements, graphical input keys or keyboards, content display windows and the like.

In the example of FIG. 1A, artificial reality system 10 includes head mounted device (HMD) 112, console 106 and, in some examples, one or more external sensors 90. As shown, HMD 112 is typically worn by user 110 and includes an electronic display and optical assembly for presenting artificial reality content 122 to user 110. In addition, HMD 112 includes one or more sensors (e.g., accelerometers) for tracking motion of the HMD and may include one or more image capture devices 138, e.g., cameras, line scanners and the like, for capturing image data of the surrounding physical environment. In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as WiFi, a mesh network or a short-range wireless communication medium. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, user 110 views the artificial reality content 122 constructed and rendered by an artificial reality application executing on console 106 and/or HMD 112. As one example, artificial reality content 122 may be a consumer gaming application in which user 110 is rendered as avatar 120 with one or more virtual objects 128A, 128B. In some examples, artificial reality content 122 may comprise a mixture of real-world imagery and virtual objects, e.g., mixed reality and/or augmented reality. In other examples, artificial reality content 122 may be, e.g., a video conferencing application, a navigation application, an educational application, training or simulation applications, or other types of applications that implement artificial reality.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Moreover, in accordance with the techniques of this disclosure, based on the sensed data, the artificial reality application detects gestures performed by user 110 and, in response to detecting one or more particular gestures, generates one or more user interface elements, e.g., UI menu 124 and UI element 126, which may be overlaid on underlying artificial reality content 122 being presented to the user. In this respect, user interface elements 124, 126 may be viewed as part of the artificial reality content 122 being presented to the user in the artificial reality environment. In this way, artificial reality system 10 dynamically presents one or more graphical user interface elements 124, 126 in response to detecting one or more particular gestures by user 110, such as particular motions, configurations, positions, and/or orientations of the user's hands, fingers, thumbs or arms. Example configurations of a user's hand may include a fist, one or more digits extended, the relative and/or absolute positions and orientations of one or more of the individual digits of the hand, the shape of the palm of the hand, and so forth. The user interface elements may, for example, be a graphical user interface, such as a menu or sub-menu with which user 110 interacts to operate the artificial reality system, or individual user interface elements selectable and manipulatable by user 110, such as toggle elements, drop-down elements, menu selection elements, two-dimensional or three-dimensional shapes, graphical input keys or keyboards, content display windows and the like. While depicted as a two-dimensional element, for example, UI element 126 may be a two-dimensional or three-dimensional shape that is manipulatable by a user performing gestures to translate, scale, and/or rotate the shape in the artificial reality environment.

Moreover, as described herein, in some examples, artificial reality system 10 may trigger generation and rendering of graphical user interface elements 124, 126 in response to other conditions, such as a current state of one or more applications being executed by the system, or the position and orientation of the particular detected gestures in a physical environment in relation to a current field of view 130 of user 110, as may be determined by real-time gaze tracking of the user, or other conditions.

More specifically, as further described herein, image capture devices 138 of HMD 112 capture image data representative of objects in the real world, physical environment that are within a field of view 130 of image capture devices 138. Field of view 130 typically corresponds with the viewing perspective of HMD 112. In some examples, such as the illustrated example of FIG. 1A, the artificial reality application renders the portions of hand 132 of user 110 that are within field of view 130 as a virtual hand 136 within artificial reality content 122. In other examples, the artificial reality application may present a real-world image of hand 132 and/or arm 134 of user 110 within artificial reality content 122 comprising mixed reality and/or augmented reality. In either example, user 110 is able to view the portions of their hand 132 and/or arm 134 that are within field of view 130 as objects within artificial reality content 122. In other examples, the artificial reality application may not render hand 132 or arm 134 of the user at all.

During operation, artificial reality system 10 may perform object recognition within image data captured by image capture devices 138 of HMD 112 to identify hand 132, including optionally identifying individual fingers or the thumb, and/or all or portions of arm 134 of user 110. Further, artificial reality system 10 may track the position, orientation, and configuration of hand 132 (optionally including particular digits of the hand) and/or portions of arm 134 over a sliding window of time. The artificial reality application analyzes any tracked motions, configurations, positions, and/or orientations of hand 132 and/or portions of arm 134 to identify one or more gestures performed by particular objects, e.g., hand 132 (including particular digits of the hand) and/or portions of arm 134 of user 110. To detect the gesture(s), the artificial reality application may compare the motions, configurations, positions and/or orientations of hand 132 and/or portions of arm 134 to gesture definitions stored in a gesture library of artificial reality system 10, where each gesture in the gesture library may be each mapped to one or more actions. In some examples, detecting movement may include tracking positions of one or more of the digits (individual fingers and thumb) of hand 132, including whether any of a defined combination of the digits (such as an index finger and thumb) are brought together to touch or approximately touch in the physical environment. In other examples, detecting movement may include tracking an orientation of hand 132 (e.g., fingers pointing toward HMD 112 or away from HMD 112) and/or an orientation of arm 134 (e.g., the normal of the arm facing toward HMD 112) relative to the current pose of HMD 112. The position and orientation of hand 132 (or a portion thereof) thereof may alternatively be referred to as the pose of hand 132 (or a portion thereof).

Moreover, the artificial reality application may analyze configurations, positions, and/or orientations of hand 132 and/or arm 134 to identify a gesture that includes hand 132 and/or arm 134 being held in one or more specific configuration, positions, and/or orientations for at least a threshold period of time. As examples, one or more particular positions at which hand 132 and/or arm 134 are being held substantially stationary within field of view 130 for at least a configurable period of time may be used by artificial reality system 10 as an indication that user 110 is attempting to perform a gesture intended to trigger a desired response by the artificial reality application, such as triggering display of a particular type of user interface element 124, 126, such as a menu. As another example, one or more particular configurations of the fingers and/or palms of hand 132 and/or arm 134 being maintained within field of view 130 for at least a configurable period of time may be used by artificial reality system 10 as an indication that user 110 is attempting to perform a gesture. Although only right hand 132 and right arm 134 of user 110 are illustrated in FIG. 1A, in other examples, artificial reality system 10 may identify a left hand and/or arm of user 110 or both right and left hands and/or arms of user 110. In this way, artificial reality system 10 may detect single-handed gestures performed by either hand, double-handed gestures, or arm-based gestures within the physical environment, and generate associated user interface elements in response to the detected gestures.

In accordance with the techniques of this disclosure, the artificial reality application determines whether an identified gesture corresponds to a gesture defined by one of a plurality of entries in a gesture library of console 106 and/or HMD 112. As described in more detail below, each of the entries in the gesture library may define a different gesture as a specific motion, configuration, position, and/or orientation of a user's hand, digit (finger or thumb) and/or arm over time, or a combination of such properties. In addition, each of the defined gestures may be associated with a desired response in the form of one or more actions to be performed by the artificial reality application. As one example, one or more of the defined gestures in the gesture library may trigger the generation, transformation, and/or configuration of one or more user interface elements, e.g., UI menu 124, to be rendered and overlaid on artificial reality content 122, where the gesture may define a location and/or orientation of UI menu 124 in artificial reality content 122. As another example, one or more of the defined gestures may indicate an interaction by user 110 with a particular user interface element, e.g., selection of UI element 126 of UI menu 124, to trigger a change to the presented user interface, presentation of a sub-menu of the presented user interface, or the like.

As described herein, HMD 112 or console 106 may detect interaction with a UI element presented within artificial reality content 122, and in response, present a graphical UI element enabling a user to specify input to be processed by artificial reality system 10. For instance, with reference to FIG. 1A, HMD 112 may detect motion of hand 132, and may further determine that the motion includes two fingers from hand 132 forming a pinching configuration in the vicinity of a UI pinch element (which may be, for example, UI element 126 or another UI element). HMD 112 may also detect that hand 132 has performed a subsequent pulling motion while in the pinching configuration. HMD 112 may, based on the detected motion, present updated artificial reality content to user 110 that includes a graphical UI element.

HMD 112 may detect further movement of hand 132 while the hand 132 is in the pinching configuration, and in response to the further movement, may update the graphical UI element and other aspects of the artificial reality content in response to the further movement. For instance, in an example where the UI element may represent a simple one-dimensional audio volume control, further movement of the hand (i.e., after recognizing the pinch and pull gesture) may be interpreted by HMD 112 as user input to adjust (e.g., increase or decrease) the audio volume. In some examples, the audio volume might be adjusted while the user's hand is being moved, providing a near-immediate response to the user's interactions with the UI element. Accordingly, a user may interact with the UI element through movements, and as those movements are made, the user may see, hear, or sense how such interactions change the artificial reality environment. Such interactions thus may serve as a way of providing input to the artificial reality system in a way that may also provide appropriate and/or useful feedback to the user, enabling a user to change, modify, or adjust aspects of the artificial reality environment in an intuitive and/or interactive way.

In other examples, a pinch and pull gesture performed in the vicinity of a UI pinch element may trigger presentation of other types of UI elements, such as those enabling a user to select one of a number of discrete input options, select a value along a scale of continuous values, select a color, or select any other appropriate input value or set of input values.

In some examples, HMD 112 may alternatively (or in addition) present a UI element in response to, or triggered by, a detecting a gesture or interaction by a user with a physical stylus. Once the gesture or interaction is detected, HMD 112 may detect further movement of the stylus and, in a manner similar to the previously-described examples, update the UI element and other aspects of the artificial reality content in response to the further movement of the stylus. For instance, the graphical UI element presented in response to the gesture or interaction with the stylus could also be an audio volume control, and further movement of the stylus may be interpreted by HMD 112 as user input to adjust (e.g., increase or decrease) the audio volume, as in the previous example. Accordingly, in such an example, a user may alternatively interact with the UI element through movement of the stylus, and in response, the user may see, hear, or sense how such interactions change the artificial reality environment.

Accordingly, the techniques of the disclosure provide specific technical improvements to the computer-related field of rendering and displaying content by an artificial reality system. For example, artificial reality systems as described herein may provide a high-quality artificial reality experience to a user, such as user 110, of the artificial reality application by generating and rendering user interface elements overlaid on the artificial reality content based on detection of intuitive, yet distinctive, gestures performed by the user.

Further, systems as described herein may be configured to detect certain gestures based on hand and arm movements that are defined to avoid tracking occlusion. Tracking occlusion may occur when one hand of the user at least partially overlaps the other hand, possibly making it difficult to accurately track the individual digits (fingers and thumb) on each hand, as well as the position and orientation of each hand. Systems as described herein, therefore, may be configured to primarily detect single-handed or single arm-based gestures. The use of single-handed or single arm-based gestures may further provide enhanced accessibility to users having large- and fine-motor skill limitations. Furthermore, systems as described herein may be configured to detect double-handed or double arm-based gestures in which the hands of the user do not interact or overlap with each other.

In addition, systems as described herein may be configured to detect gestures that provide self-haptic feedback to the user. For example, a thumb and one or more fingers on each hand of the user may touch or approximately touch in the physical world as part of a pre-defined gesture indicating an interaction with a particular user interface element in the artificial reality content. The touch between the thumb and one or more fingers of the user's hand may provide the user with a simulation of the sensation felt by the user when interacting directly with a physical user input object, such as a button on a physical keyboard or other physical input device.

Some of the techniques of this disclosure may provide specific technical improvements and advantages. For example, user interface menus and similar UI elements presented in an artificial reality environment are typically non-tangible, and some users may find that interacting with virtual UI elements to be unintuitive, typically because interacting with virtual menus with a hand or a stylus might not provide any tactile feedback. Moving fingers into a pinching configuration, on the other hand, is a specific motion that provides a sense of haptic (i.e. "self-haptic") feedback, since the user's fingers are being brought together, which itself provides some tactile feedback. This may satisfy a user's expectation for tactile feedback when that user is performing an action (e.g., interacting with a UI element) that is expected to cause a response or have an effect on the artificial reality environment.

FIG. 1B is an illustration depicting another example artificial reality system 20 in accordance with the techniques of the disclosure. Similar to artificial reality system 10 of FIG. 1A, in some examples, artificial reality system 20 of FIG. 1B may present and control user interface elements specifically designed for user interaction and manipulation within an artificial reality environment. Artificial reality system 20 may also, in various examples, generate and render certain graphical user interface elements to a user in response detection of to one or more particular gestures of the user.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128C (collectively, "virtual objects 128") as spatially overlaid upon real world objects 108A-108C (collectively, "real world objects 108"). Further, from the perspective of HMD 112C, artificial reality system 20 renders avatars 120A, 120B based upon the estimated positions for users 110A, 110B, respectively.

In some examples, each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may each operate substantially similar to HMD 112 of FIG. 1A by tracking hand 132 and/or arm 134 of user 110C, and rendering the portions of hand 132 that are within field of view 130 as virtual hand 136 within artificial reality content 122. HMD 112B may receive user inputs from controllers 114 held by user 110B. HMD 112A may also operate substantially similar to HMD 112 of FIG. 1A and receive user inputs by tracking movements of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using another type of communication links.

In a manner similar to the examples discussed above with respect to FIG. 1A, console 106 and/or HMD 112C of artificial reality system 20 generates and renders user interface elements 124, 126, which may be overlaid upon the artificial reality content 122 displayed to user 110C. Moreover, console 106 and/or HMD 112C may trigger the generation and dynamic display of the user interface elements 124, 126 based on detection, via pose tracking, of intuitive, yet distinctive, gestures performed by user 110C. For example, artificial reality system 20 may dynamically present one or more graphical user interface elements 124, 126 in response to detecting one or more particular gestures by user 110C, such as particular motions, configurations, positions, and/or orientations of the user's hands, fingers, thumbs or arms. As shown in FIG. 1B, in addition to image data captured via camera 138 of HMD 112C, input data from external cameras 102 may be used to track and detect particular motions, configurations, positions, and/or orientations of hands and arms of users 110, such as hand 132 of user 110C, including movements of individual and/or combinations of digits (fingers, thumb) of the hand.

As described herein, and with reference to FIG. 1B, any of HMDs 112A, 112B, and 112C may detect interaction with a UI element presented at a display within those HMDs, and in response present a graphical UI element enabling that user to specify input to be processed by artificial reality system 20. For example, HMD 112C (or console 106) may detect motion of hand 132, and may further determine that the motion includes two fingers from hand 132 forming a pinching configuration in the vicinity of a UI pinch element. HMD 112C may also detect that hand 132 has performed a subsequent pulling motion while in the pinching configuration. HMD 112C may, in response, present updated artificial reality content to user 110 that includes a UI element enabling user 110C to provide input to artificial reality system 20 in a manner similar to that described in FIG. 1A and as further described below.

Figure 2:
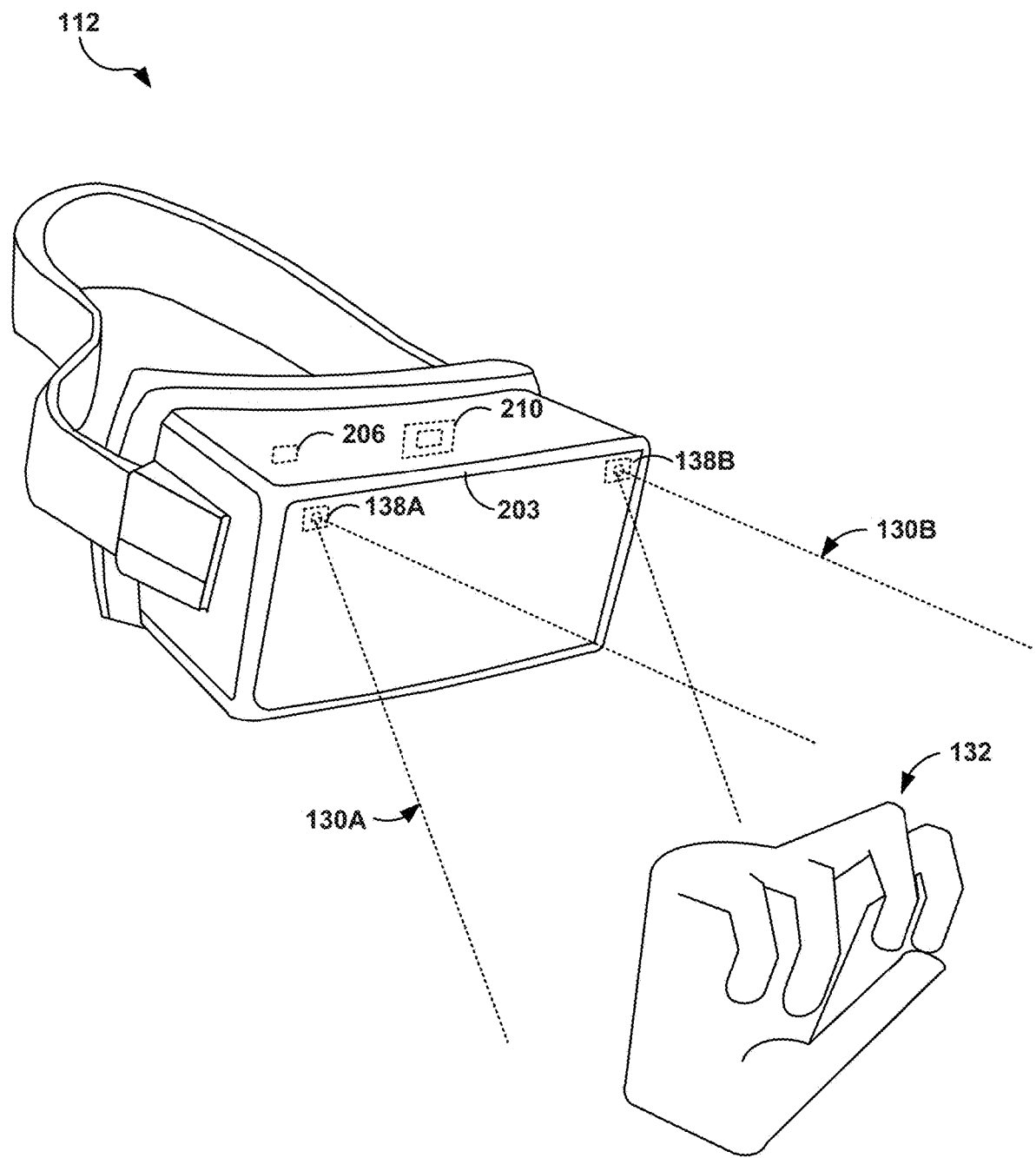
FIG. 2 is an illustration depicting an example HMD that operates in accordance with the techniques of the disclosure.

FIG. 2 is an illustration depicting an example HMD 112 configured to operate in accordance with the techniques of the disclosure. HMD 112 of FIG. 2 may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD may take the form of other wearable head mounted displays, such as glasses.

As further shown in FIG. 2, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to, based on the sensed data, identify a specific gesture or combination of gestures performed by the user and, in response, perform an action. For example, in response to one identified gesture, control unit 210 may generate and render a specific user interface element overlaid on artificial reality content for display on electronic display 203. As explained herein, in accordance with the techniques of the disclosure, control unit 210 may perform object recognition within image data captured by image capture devices 138 to identify a hand 132, fingers, thumb, arm or another part of the user, and track movements of the identified part to identify pre-defined gestures performed by the user. In response to identifying a pre-defined gesture, control unit 210 takes some action, such as selecting an option from an option set associated with a user interface element, translating the gesture into input (e.g., characters), launching an application or otherwise displaying content, and the like. In some examples, control unit 210 dynamically generates and presents a user interface element, such as a menu, in response to detecting a pre-defined gesture specified as a "trigger" for revealing a user interface. In other examples, control unit 210 performs such functions in response to direction from an external device, such as console 106, which may perform, object recognition, motion tracking and gesture detection, or any part thereof.

As described herein, HMD 112 may detect a motion of hand 132 corresponding to two fingers from hand 132 forming a pinching configuration in the vicinity of another UI element (e.g., a UI pinch element, not shown in FIG. 2). HMD 112 may also detect hand 132 performing a subsequent pulling motion (e.g., toward HMD 112 in FIG. 2) while in the pinching configuration. HMD 112 may, in some examples, interpret such motion as a request by a user of HMD 112 to present a graphical UI element, which may enable the user to provide input in response to further movements of hand 132.

Figure 3:
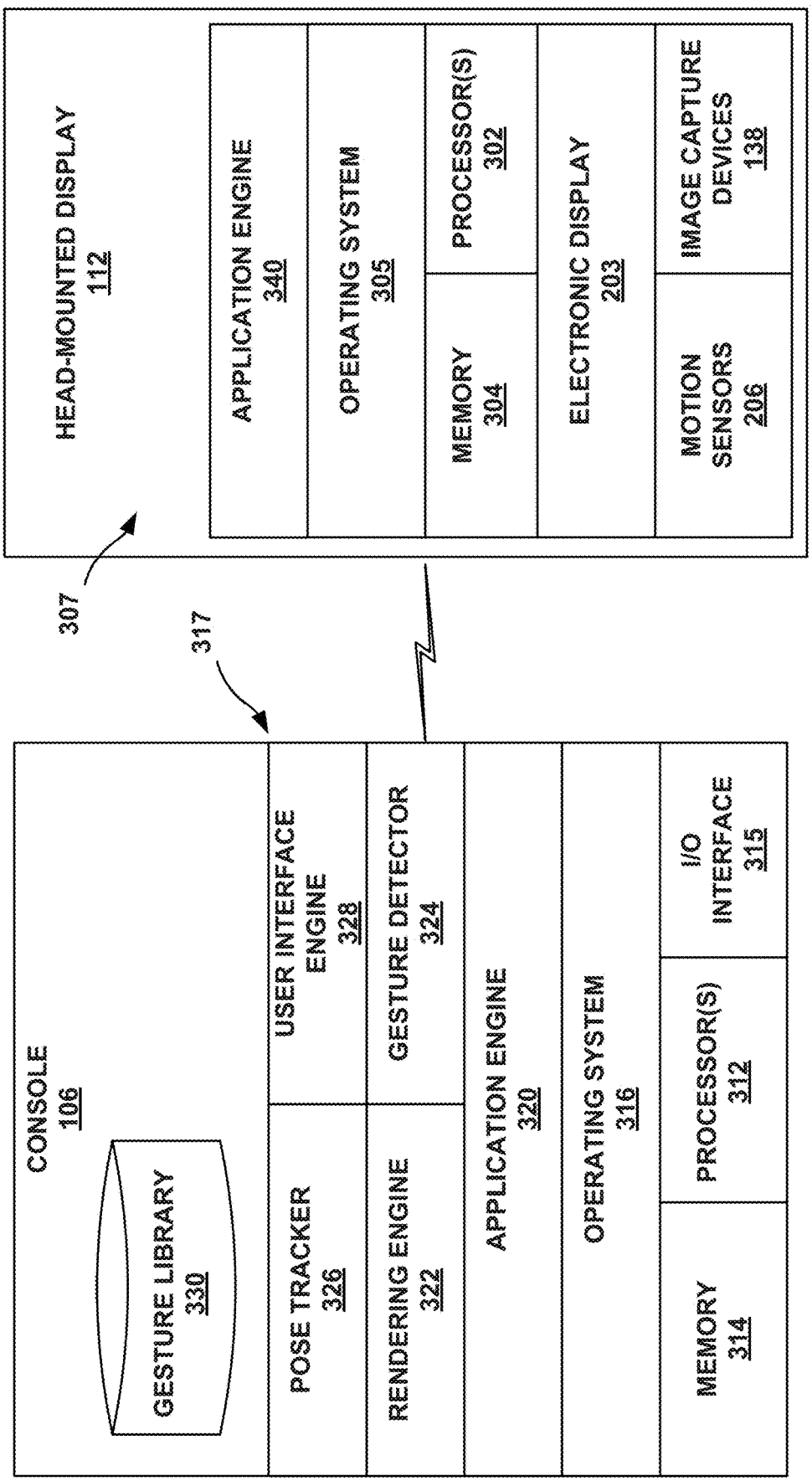
FIG. 3 is a block diagram showing example implementations of a console and an HMD of the artificial reality systems of FIGS. 1A, 1B.

FIG. 3 is a block diagram showing example implementations of console 106 and head mounted display 112 of artificial reality system 10, 20 of FIGS. 1A, 1B. In the example of FIG. 3, console 106 performs pose tracking, gesture detection, and user interface generation and rendering for HMD 112 in accordance with the techniques described herein based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the example of FIG. 2, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or HMD 112 to perform gesture detection and user interface generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, and the like. Moreover, the one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 317 of console 106 operate to provide an overall artificial reality application. In this example, software applications 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for output and/or presentation (e.g., display, sounds, haptic feedback through HMD 112 or otherwise) to the user by application engine 340 of HMD 112.

Application engine 320 and rendering engine 322 construct the artificial content for display and/or presentation to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Moreover, based on the sensed data, gesture detector 324 analyzes the tracked motions, configurations, positions, and/or orientations of objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify a hand and/or arm of user 110, and track movements of the hand and/or arm relative to HMD 112 to identify gestures performed by user 110. Gesture detector 324 may track movement, including changes to position and orientation, of the hand, digits, and/or arm based on the captured image data, and compare motion vectors of the objects to one or more entries in gesture library 330 to detect a gesture or combination of gestures performed by user 110. Some entries in gesture library 330 may each define a gesture as a series or pattern of motion, such as a relative path or spatial translations and rotations of a user's hand, specific fingers, thumbs, wrists and/or arms. Some entries in gesture library 330 may each define a gesture as a configuration, position, and/or orientation of the user's hand and/or arms (or portions thereof) at a particular time, or over a period of time. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, in accordance with the techniques of this disclosure, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting objects, launching applications, and the like.

Figure 4:
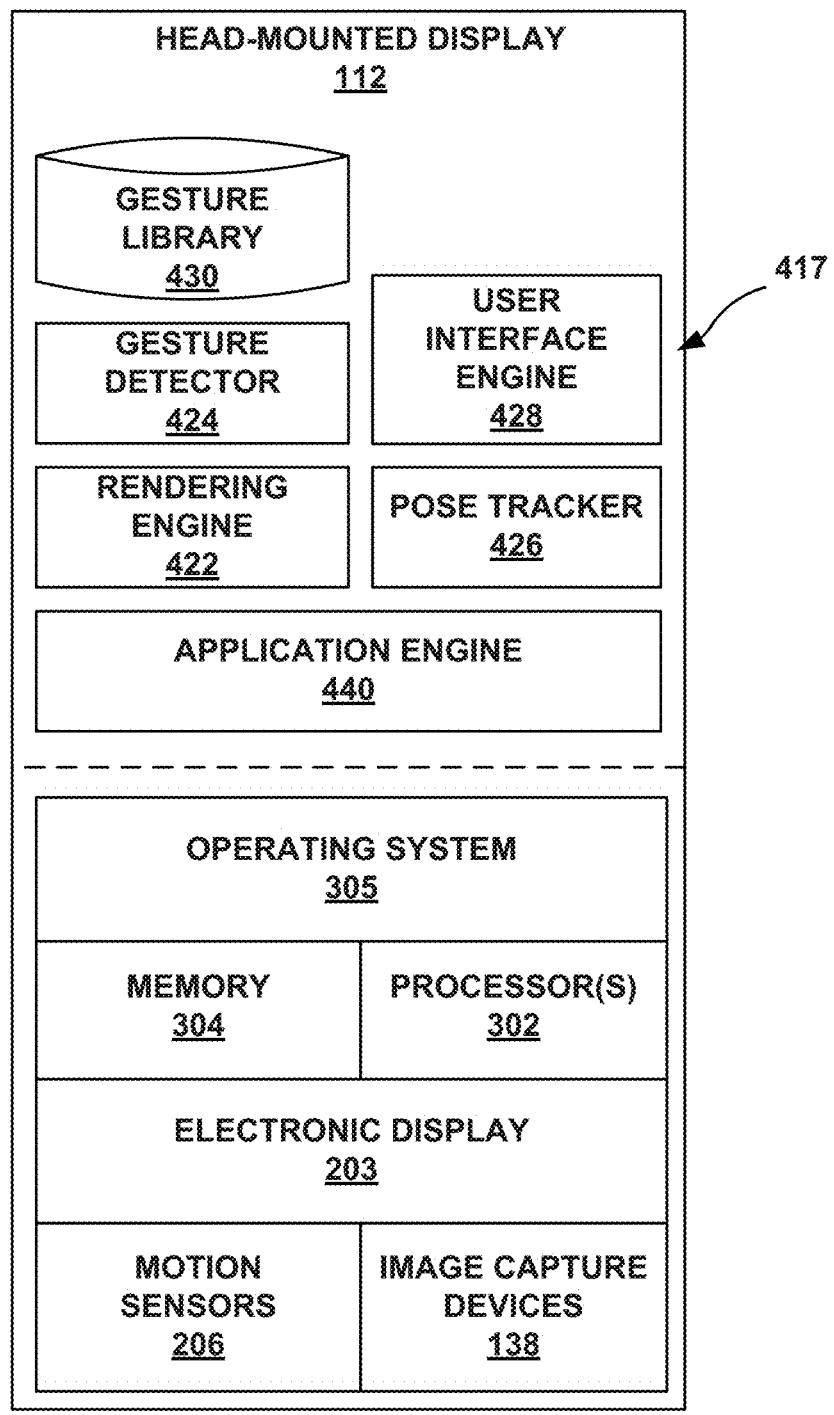
FIG. 4 is a block diagram depicting an example in which gesture detection and user interface generation is performed by the HMD of the artificial reality systems of FIGS. 1A, 1B in accordance with the techniques of the disclosure.

FIG. 4 is a block diagram depicting an example in which gesture detection and user interface generation is performed by HMD 112 of the artificial reality systems of FIGS. 1A, 1B in accordance with the techniques of the disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct user interface elements overlaid on, or as part of, the artificial content for display to user 110 in accordance with detected gestures of user 110. In some examples, rendering engine 422 constructs the 3D, artificial reality content which may be overlaid, at least in part, upon the real-world, physical environment of user 110.

Similar to the examples described with respect to FIG. 3, based on the sensed data, gesture detector 424 analyzes the tracked motions, configurations, positions, and/or orientations of objects (e.g., hands, arms, wrists, fingers, palms, thumbs) of the user to identify one or more gestures performed by user 110. In accordance with the techniques of the disclosure, user interface engine 428 generates user interface elements as part of, e.g., overlaid upon, the artificial reality content to be displayed to user 110 and/or performs actions based on one or more gestures or combinations of gestures of user 110 detected by gesture detector 424. More specifically, gesture detector 424 analyzes objects recognized within image data captured by image capture devices 138 of HMD 112 and/or sensors 90 or external cameras 102 to identify a hand and/or arm of user 110, and track movements of the hand and/or arm relative to HMD 112 to identify gestures performed by user 110. Gesture detector 424 may track movement, including changes to position and orientation, of the hand, digits, and/or arm based on the captured image data, and compare motion vectors of the objects to one or more entries in gesture library 430 to detect a gesture or combination of gestures performed by user 110.

Gesture library 430 is similar to gesture library 330 of FIG. 3. Each of the entries in gesture library 430 may specify, for the defined gesture or series of gestures, conditions that are required for the gesture to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

In response to detecting a matching gesture or combination of gestures, HMD 112 performs the response or action assigned to the matching entry in gesture library 430. For example, in accordance with the techniques of this disclosure, certain specialized gestures may be pre-defined such that, in response to gesture detector 424 detecting one of the pre-defined gestures, user interface engine 428 dynamically generates a user interface as an overlay to artificial reality content being displayed to the user, thereby allowing the user 110 to easily invoke a user interface for configuring HMD 112 while viewing artificial reality content. In other examples, in response to gesture detector 424 detecting one of the pre-defined gestures, user interface engine 428 and/or application engine 440 may receive input, select values or parameters associated with user interface elements, launch applications, modify configurable settings, send messages, start or stop processes or perform other actions.

Figure 5A:
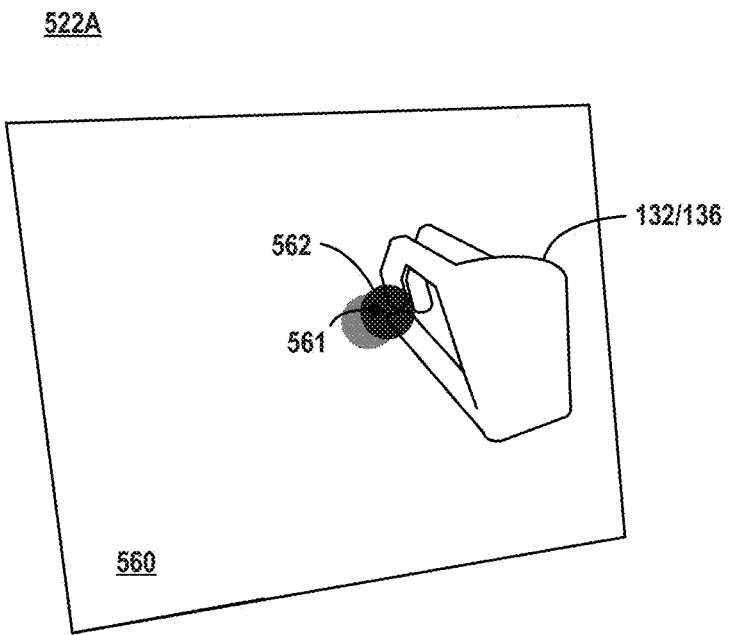
FIG. 5A, FIG. 5B, and FIG. 5C illustrate an example sequence of artificial reality content presented in response to a pinch and pull gesture performed by a user, in accordance with one or more aspects of the present disclosure.
Figure 5B:
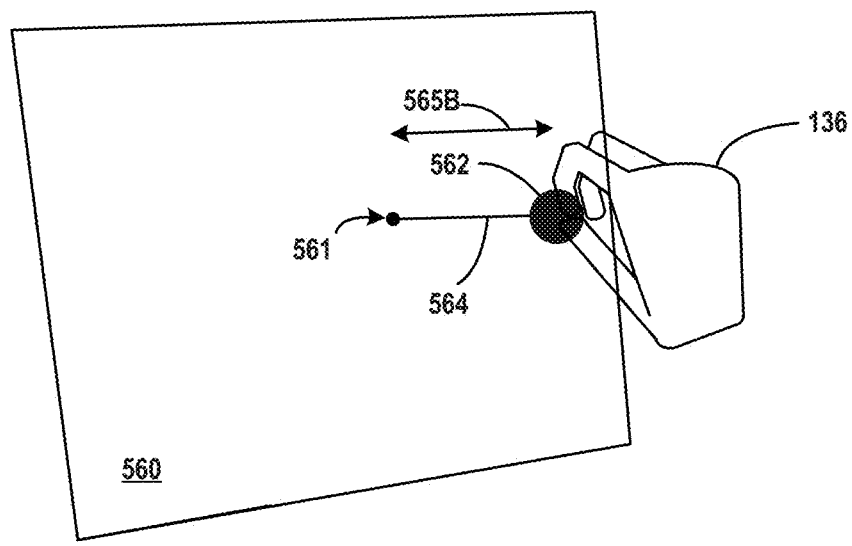
Figure 5C:
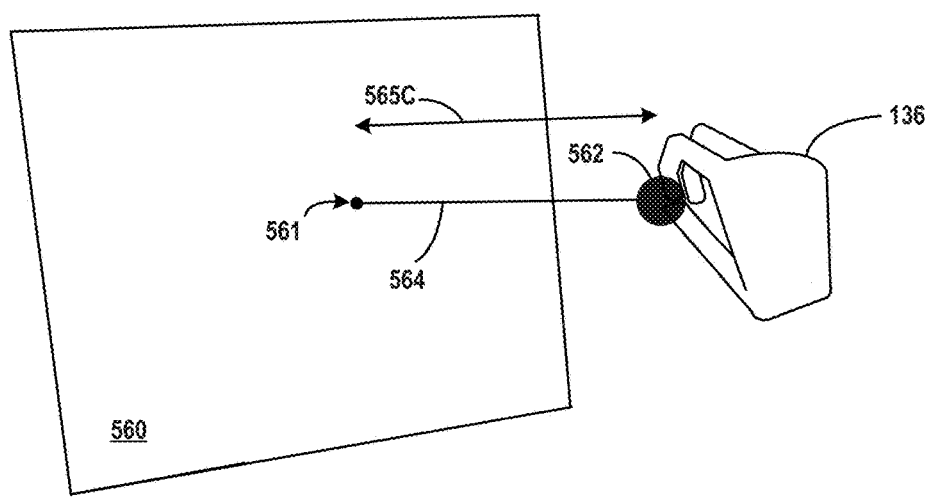

FIG. 5A, FIG. 5B, and FIG. 5C illustrate an example sequence of artificial reality content presented at an artificial reality display in response to a pinch and pull gesture performed by a user of HMD 112, in accordance with one or more aspects of the present disclosure. FIG. 5A, FIG. 5B, and FIG. 5C illustrate artificial reality content 522A, artificial reality content 522B, and artificial reality content 522C, respectively (generally referenced as "artificial reality content 522"). In each case, artificial reality content 522 includes virtual hand 136 interacting with UI pinch element 562, positioned near or at varying distances from UI panel 560. References herein to hand 132 correspond to the physical hand corresponding to virtual hand 136, and in that sense, hand 132 and virtual hand 136 may correspond to each other; where appropriate, hand 132 and virtual hand 136 may be referred to herein interchangeably. Also, operations described with reference to FIG. 5A, FIG. 5B, and FIG. 5C are described below primarily with reference to the block diagram of FIG. 4. However, such operations may be performed in a corresponding manner by corresponding components, modules, and/or elements of FIG. 3. Accordingly, it should be understood that operations described herein as being performed by HMD 112 could, in other examples, be performed by other devices or systems, including, for example, console 106 (e.g., in examples corresponding to FIG. 3).

In the example of FIG. 5A, and in accordance with one or more aspects of the present disclosure, HMD 112 may present artificial reality content 522A. For instance, with reference to an example that can be described in the context of FIG. 4, pose tracker 426 detects movement information and data, such as from sensors 90 (see, e.g., FIG. 1A). Pose tracker 426 outputs pose information to rendering engine 422. Rendering engine 422 constructs artificial reality content 522A based the detected input and based on a viewing perspective of artificial reality content 122, as determined by pose tracker 426. Rendering engine 422 causes application engine 440 to output artificial reality content 522A for display and/or presentation in the manner illustrated in FIG. 5A. Artificial reality content 522A may be presented at a display within HMD 112, for example, such as display 203 illustrated in FIG. 2, FIG. 3, and/or FIG. 4.

In FIG. 5A, UI pinch element 562 may be initially positioned at UI pinch element default position 561. Hand 132 (or virtual hand 136 as a representation of hand 132) is shown positioned in the vicinity of UI pinch element default position 561.

FIG. 5B illustrates an example of updated artificial reality content 522B that may be presented by HMD 112 in response to movement of hand 132. For instance, with reference to FIG. 4 and FIG. 5A, gesture detector 424 detects input, such as from one or more of image capture device 138, cameras 102, and/or sensors 90. Gesture detector 424 determines, based on the input, information about the motion of hand 132. Gesture detector 424 further determines that the motion of hand 132 includes two fingers from hand 132 forming a pinching configuration in the vicinity of UI pinch element 562, which is located at UI pinch element default position 561 in FIG. 5A. Gesture detector 424 determines an amount of time that hand 132 has been held in the pinching configuration. Gesture detector 424 outputs, to rendering engine 422, information about the pinching configuration associated with UI pinch element 562. Gesture detector 424 further determines that hand 132 has performed a subsequent pulling motion while in the pinching configuration. Gesture detector 424 outputs, to rendering engine 422, information about the pulling motion. Rendering engine 422 updates artificial reality content 522A so that UI pinch element 562 is moved in a manner consistent with the information about the pulling motion received from gesture detector 424. In addition, rendering engine 422 updates artificial reality content 522A to generate artificial reality content 522B. Rendering engine 422 causes application engine 440 to present artificial reality content at display 203, in the manner illustrated in FIG. 5B.

In FIG. 5B, artificial reality content 522B corresponds to artificial reality content 522A after being updated in response to movement of hand 132 in the manner described. For example, UI pinch element 562 is shown moved a distance from UI pinch element default position 561. Artificial reality content 522B illustrates UI string element 564 between UI pinch element default position 561 and the new position of UI pinch element 562, thereby providing a visual indication of the distance and spatial location of UI pinch element 562 relative to UI pinch element default position 561. Distance 565B represents the distance of the pulling motion performed by hand 132, and has a length approximately equal to UI string element 564. In some examples, gesture detector 424 may require that the pulling motion of hand 132 while hand 132 is in the pinched configuration be sufficient (e.g., sufficient in length or distance) to exceed a threshold distance in order to qualify as a pinch and pull gesture. In other words, movement as illustrated in FIG. 5B (e.g., corresponding to distance 565B) might not be sufficient to qualify as a pinch and pull gesture.

FIG. 5C illustrates an example of updated artificial reality content that may be presented by HMD 112 in response to further movement of hand 132. For instance, with reference to FIG. 5B and FIG. 4, gesture detector 424 detects further input. Gesture detector 424 analyzes the input and determines, based on the input, that hand 132, still in the pinching configuration, has been moved sufficiently to correspond to a pinch and pull gesture. Gesture detector 424 outputs, to user interface engine 428, information about the detected pinch and pull gesture. User interface engine 428 causes rendering engine 422 to generate artificial reality content 522C, illustrating a longer UI string element 564. Rendering engine 422 causes application engine 440 to present artificial reality content 522C at display 203 in the manner illustrated in FIG. 5C.

In FIG. 5C, distance 565C is longer than distance 565B (shown in FIG. 5B). Distance 565C may, in the example of FIG. 5C, be sufficiently long to qualify as a pinch and pull gesture, whereas the movement of hand 132 (or virtual hand 136) illustrated in FIG. 5B might not be sufficient. In some examples, and as further described herein, movement qualifying as a pinch and pull gesture may trigger or gate further operations by HMD 112, including, but not limited to, display of a user interface element or further artificial reality content.

Figure 6A:
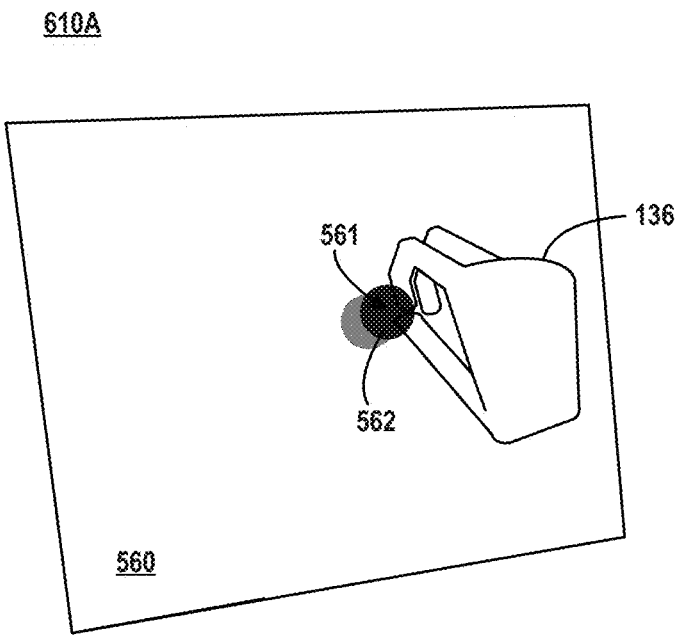
FIG. 6A, FIG. 6B, and FIG. 6C illustrate a sequence of artificial reality content that includes an example one-dimensional slider UI element presented at a display in response to a pinch and pull gesture performed by a user, in accordance with one or more aspects of the present disclosure.
Figure 6B:
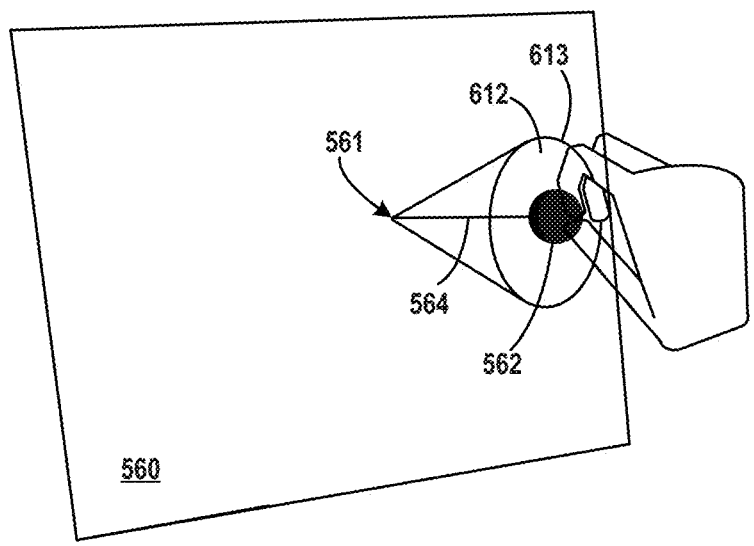
Figure 6C:
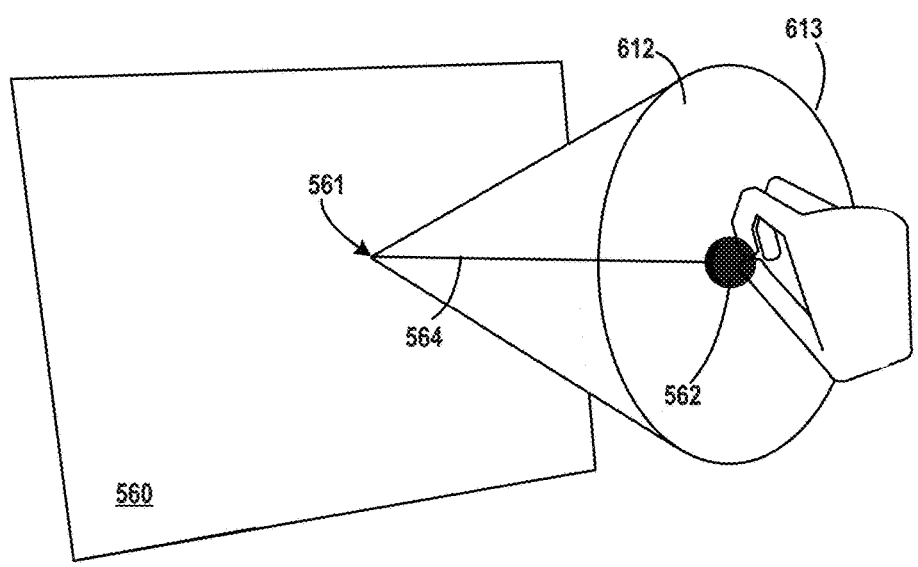

FIG. 6A, FIG. 6B, and FIG. 6C illustrate a sequence of artificial reality content that includes an example one-dimensional slider UI element presented at a display in response to a pinch and pull gesture performed by a user of HMD 112, in accordance with one or more aspects of the present disclosure. FIG. 6A, FIG. 6B, and FIG. 6C illustrate artificial reality content 610A, artificial reality content 610B, and artificial reality content 610C, respectively. Each instance of artificial reality content includes virtual hand 136 and UI pinch element 562 at varying distances from UI panel 560. In FIG. 6A, UI pinch element 562 is positioned at UI pinch element default position 561.

In the example of FIG. 6A, an in accordance with one or more aspects of the present disclosure, HMD 112 may present artificial reality content 610A. For instance, with reference to an example that can be described in the context of FIG. 4, pose tracker 426 detects movement information and data, such as from sensors 90. Pose tracker 426 outputs pose information to rendering engine 422, and rendering engine 422 constructs artificial reality content 610A based the detected input and based on a viewing perspective of artificial reality content 122, as determined by pose tracker 426. Rendering engine 422 causes application engine 440 to output artificial reality content 610A for display and/or presentation in the manner illustrated in FIG. 6A. Artificial reality content 610A may be presented at a display within HMD 112, for example, such as display 203 illustrated in FIG. 2.

FIG. 6B illustrates an example one-dimensional slider UI element that may be presented by HMD 112 in response to a pinch and pull movement of hand 132. For instance, with reference to FIG. 4 and FIG. 6A, gesture detector 424 detects input, such as from one or more of image capture device 138, cameras 102, and/or sensors 90. Gesture detector 424 determines, based on the input, that hand 132 has been moved so that two fingers from hand 132 form a pinching configuration in the vicinity of UI pinch element 562. Gesture detector 424 determines that hand 132 has performed a subsequent pulling motion while in the pinching configuration. Gesture detector 424 determines that the detection motion qualifies as a pinch and pull gesture, as described in connection with FIG. 5A, FIG. 5B, and FIG. 5C. Rendering engine 422 updates artificial reality content 610A to generate artificial reality content 610B, reflecting movement of hand 132. Rendering engine 422 causes application engine 440 to present artificial reality content 610B at a display in the manner illustrated in FIG. 6B.

In FIG. 6B, artificial reality content 610B includes a UI input element, which, in the example of FIG. 6B, is one-dimensional slider UI element 612. In the example described, slider UI element 612 is presented in response to the pinch and pull gesture detected by gesture detector 424. Artificial reality content 610B includes UI string element 564 which reflects a distance corresponding to movement of hand 132 after hand 132 is in a pinch configuration. Circle 613 that encircles UI pinch element 562 is part of one-dimensional slider UI element 612, and the diameter of circle 613 around UI pinch element 562 may be translated into a continuous (i.e., non-discrete) input value. In some examples, the input value might alternatively correspond to the length of UI string element 564, representing the distance between UI pinch element default position 561 and UI pinch element 562. In either case, the input value represented by one-dimensional slider UI element 612 may correspond to input for an audio volume control, input for a visual zoom value, or any other input that might be represented by a one-dimensional continuous variable.

FIG. 6C illustrates an example of updated artificial reality content that may be presented by HMD 112 in response to further movement of hand 132. For instance, with reference to FIG. 6B and FIG. 4, gesture detector 424 detects further input. Gesture detector 424 analyzes the input and determines, based on the input, that hand 132 has been pulled further from UI pinch element default position 561, while still in the pinching configuration. Gesture detector 424 outputs, to user interface engine 428, information about the additional movement. Rendering engine 422 updates artificial reality content 610B to generate artificial reality content 610C, illustrating a longer UI string element 564 and a larger diameter circle 613 around UI pinch element 562. Rendering engine 422 causes application engine 440 to present artificial reality content 610C at a display in the manner illustrated in FIG. 6C.

In FIG. 6C, one-dimensional slider UI element 612 is updated so that circle 613 has a larger diameter and/or a longer UI string element 564 than in FIG. 6B. The larger value represented by updated circle 613 may represent and/or correspond to an updated, larger input value.

HMD 112 may detect movement identifying the user's selected input. For instance, in some examples, and with reference to FIG. 4 and FIG. 6C, gesture detector 424 detects further input. Gesture detector 424 determines that the input corresponds to the pinched fingers of hand 132 being moved apart, corresponding to a motion releasing UI pinch element 562. Gesture detector 424 outputs information about the release motion to user interface engine 428. User interface engine 428 determines, based on the position of UI string element 564 when the release motion was detected, a selected input value, corresponding to the input value selected by the user of HMD 112. In some examples, the selected input value corresponds to a value that corresponds to the last state of one-dimensional slider UI element 612 before hand 132 released UI pinch element 562. User interface engine 428 outputs information about the selected input value to application engine 440. Application engine 440 updates the environment in a manner consistent with the selected input value. How the environment is updated may depend on what one-dimensional slider UI element 612 is associated with. In some examples, one-dimensional slider UI element 612 may be used for adjusting audio volume, brightness, or any other appropriate attribute of the artificial reality environment.

HMD 112 may update artificial reality content 610C to remove one-dimensional slider UI element 612. For instance, with reference to FIG. 4 and FIG. 6C, user interface engine 428 notifies rendering engine 422 that hand 132 has released UI pinch element 562. Rendering engine 422 generates an updated version of artificial reality content 610C, removing one-dimensional slider UI element 612 from artificial reality content 610C, and restoring UI pinch element 562 to UI pinch element default position 561 (see, e.g., FIG. 6A). Rendering engine 422 causes application engine 440 to present the updated artificial reality content 610C at a display associated with HMD 112.

In the example described, HMD 112 identifies the user's selected input when detecting that the pinched fingers of hand 132 have been moved apart. Such a motion may correspond generally to a motion releasing UI pinch element 562, indicating that the interaction with one-dimensional slider UI element 612 should be terminated. In other examples, however, HMD 112 may identify the user's selected input in another way, including, but not limited to recognizing a different motion of hand 132, a different gesture involving hand 132, or any other motion of hand 132 or of arm 134.

Figure 7A:
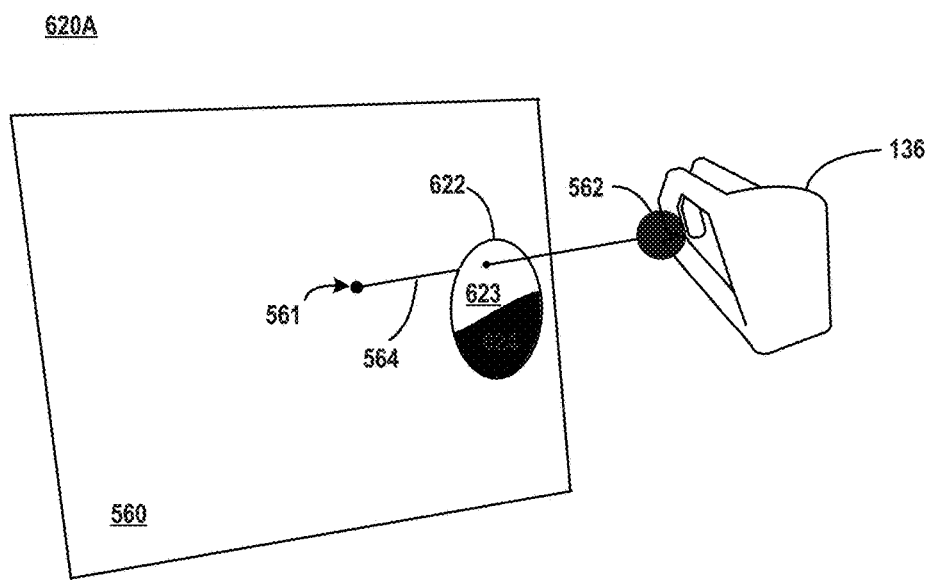
FIG. 7A and FIG. 7B illustrate a sequence of artificial reality content that includes an example switch UI element presented at a display in response to a pinch and pull gesture performed by a user, in accordance with one or more aspects of the present disclosure.
Figure 7B:
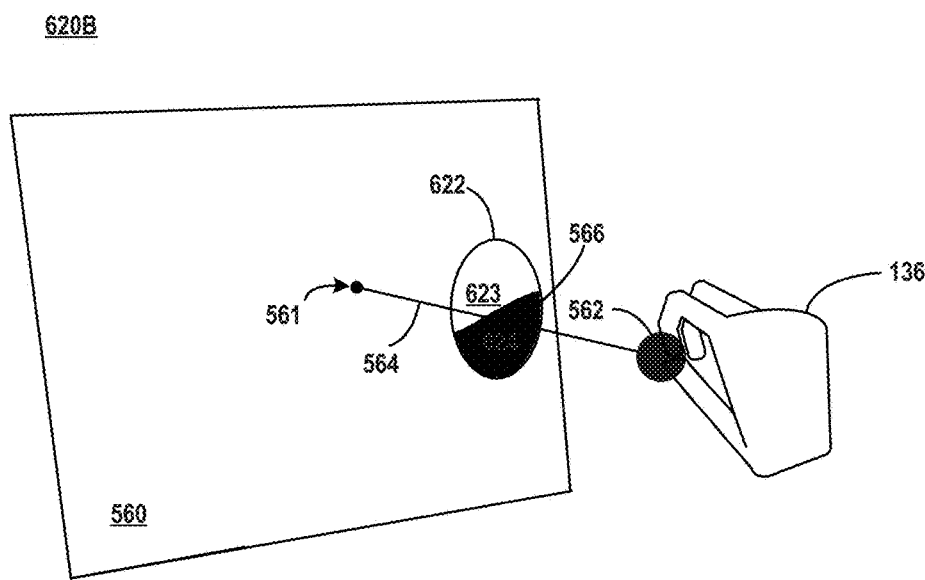

FIG. 7A and FIG. 7B illustrate a sequence of artificial reality content that includes an example switch UI element (i.e., a UI input element) presented at a display in response to a pinch and pull gesture performed by a user of HMD 112, in accordance with one or more aspects of the present disclosure. FIG. 7A and FIG. 7B illustrate artificial reality content 620A and artificial reality content 620B, respectively. Each instance of artificial reality content 620 includes UI pinch element 562, UI string element 564, and virtual hand 136 after a pinch and pull gesture has been recognized.

In the example of FIG. 7A, an in accordance with one or more aspects of the present disclosure, HMD 112 may present switch UI element 622 within artificial reality content 620A. For instance, with reference to FIG. 4 and FIG. 7A, gesture detector 424 detects a pinching configuration of hand 132 in the vicinity of UI pinch element default position 561, followed by a pulling motion of hand 132. Gesture detector 424 determines that the movement of hand 132 corresponds to a pinch and pull gesture. Rendering engine 422 constructs artificial reality content 620A including switch UI element 622. Rendering engine 422 causes application engine 440 to output artificial reality content 620A for display and/or presentation in the manner illustrated in FIG. 7A.

In FIG. 7A, artificial reality content 620A includes switch UI element 622, which includes a first switch position 623 and a second switch position 624. UI string element 564 intersects switch UI element 622, and in the example shown in FIG. 7A, UI string element 564 intersects switch UI element 622 within switch position 623. Gesture detector 424 determines, based on the position of UI pinch element 562 and the intersection of UI string element 564 in switch UI element 622, whether switch position 623 or switch position 624 is being selected by the user positioning of hand 132. In the example of 7A, rendering engine 422 interprets the position and movement of hand 132 to correspond to a first switch position, since UI string element 564 intersects switch position 623.

FIG. 7B illustrates an example of updated artificial reality content that may be presented by HMD 112 in response to further movement of hand 132. For instance, with reference to FIG. 7A and FIG. 4, gesture detector 424 detects further input that gesture detector 424 determines corresponds to a translation of hand 132 being moved lower. Gesture detector 424 outputs information to user interface engine 428, and user interface engine 428 determines that the movement causes UI string element 564 to intersect switch position 624. User interface engine 428 determines that the position and movement of hand 132 to correspond to a selection of switch position 624. Rendering engine 422 updates artificial reality content 620A to generate artificial reality content 620B, reflecting UI string element 564 intersecting switch position 624. Rendering engine 422 causes application engine 440 to output artificial reality content 620B for display in the manner illustrated in FIG. 7B.

In FIG. 7B, UI pinch element 562 has been positioned by hand 132 so that UI string element 564 intersects switch position 624, and not switch position 623, thereby corresponding to a toggle of switch UI element 622. In some examples, rendering engine 422 may update UI pinch element 562 to a different color, shade, or pattern to reflect the toggle of switch UI element 622 or the new value corresponding to switch UI element 622. For instance, the color of UI pinch element 562 may be changed to be similar to or the same as that of the region corresponding to switch position 624.

Figure 7C:
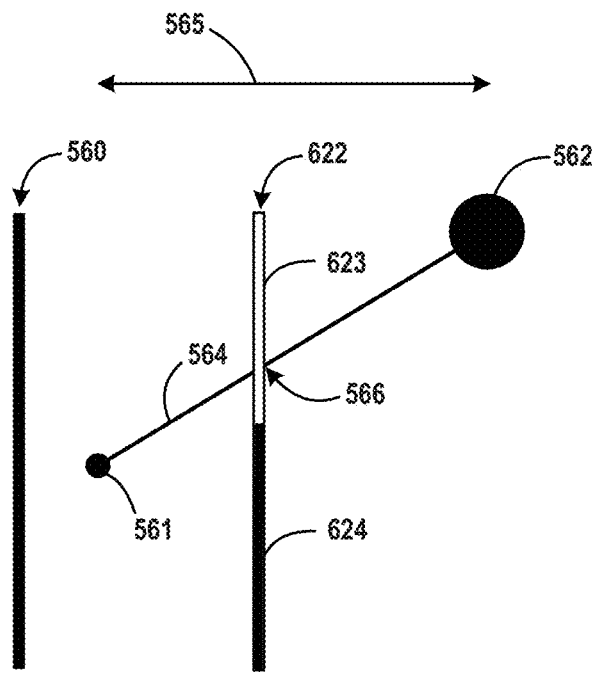
FIG. 7C is a conceptual diagram illustrating a two-dimensional representation of a pinch and pull gesture with respect to a switch UI element.

FIG. 7C is a conceptual diagram illustrating a two-dimensional representation of a pinch and pull gesture with respect to a switch UI element. FIG. 7C generally corresponds to switch UI element 622 as illustrated in FIG. 7A, showing UI pinch element 562 in the "picked up" or "pulled" state. FIG. 7C illustrates relative distances and spatial locations in a plane normal to UI panel 560 in FIG. 7A. In the example of FIG. 7A, switch UI element 622 may be parallel to UI panel 560, so switch UI element 622 is, like UI panel 560, also shown normal to the plane illustrated in FIG. 7C. In FIG. 7C, UI pinch element default position 561 and UI pinch element 562 are illustrated with UI string element 564 extending between UI pinch element default position 561 and UI pinch element 562. In some examples, UI pinch element default position 561 is not positioned right at UI panel 560, but rather, is positioned a slight distance from UI panel 560 in the manner shown in FIG. 7C. Providing such a distance between UI panel 560 and UI pinch element default position 561 enables the user to visualize grabbing or pinching UI pinch element 562 (when positioned at UI pinch element default position 561) by reaching slightly behind UI pinch element 562.

In the example of FIG. 7C, UI string element 564 intersects switch UI element 622 within switch position 623, corresponding to the toggle position illustrated in FIG. 7A. As illustrated, switch UI element 622 is positioned between UI pinch element default position 561 and UI pinch element 562, and the position of switch UI element 622 may correspond to the threshold distance that UI pinch element 562 may be required to be pulled in order to qualify as a pulling motion sufficient to trigger a pinch and pull gesture. In other examples, switch UI element 622 may be positioned elsewhere, such as at a position parallel to UI panel 560 but at UI pinch element default position 561, or at a distance from UI pinch element default position 561 that does not correspond to the threshold pulling distance for the pinch and pull gesture.

Figure 8A:
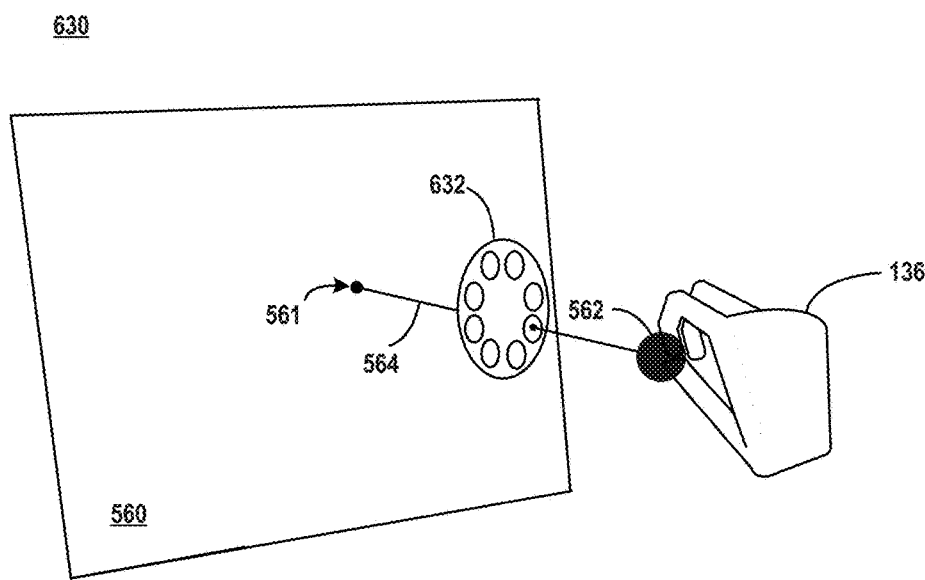
FIG. 8A illustrates artificial reality content including an example radial item picker UI element, in accordance with one or more aspects of the present disclosure.

FIG. 8A illustrates artificial reality content including an example radial item picker UI input element, in accordance with one or more aspects of the present disclosure. In the example of FIG. 8A, user interface engine 428 may identify one of a discrete number of input values by determining where UI string element 564 intersects radial item picker UI element 632. In some examples, user interface engine 428 may make such a determination based on information from gesture detector 424 interpreting movement of hand 132. In the example shown in FIG. 8A, user interface engine 428 determines, based on the positioning of hand 132, which of eight discrete input values (each represented by one of eight small ovals within radial item picker UI element 632) is being selected by the user. The input values shown in radial item picker UI element 632 may correspond to any appropriate content for selection as input, such as icons, emojis, specific colors, specific menu items, or the like. Although the selectable items in radial item picker UI element 632 are shown as oval shaped display elements arranged in a radial fashion, other display elements and arrangements may be used. For example, radial item picker UI element 632 may, in other examples, present a grid of square or rectangular display elements, a stack of menu items, or a mosaic of variably-shaped display icons. A user may select one of the display elements by terminating the pinching and pull gesture, such as by releasing the pinching configuration of hand 132, or by performing another motion.

Figure 8B:
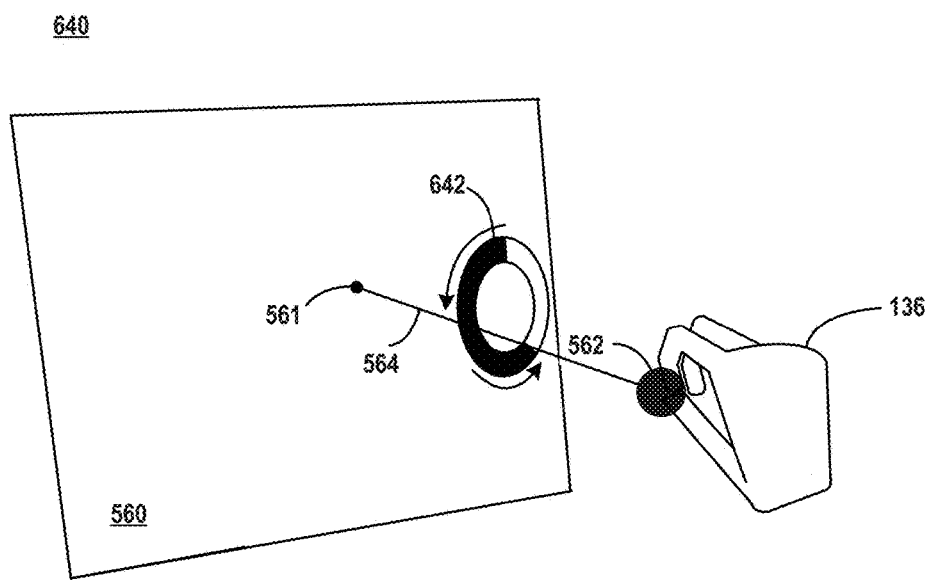
FIG. 8B illustrates artificial reality content including an example radial slider UI element, in accordance with one or more aspects of the present disclosure.

FIG. 8B illustrates artificial reality content including an example radial slider UI input element, in accordance with one or more aspects of the present disclosure. In the example of FIG. 8B, user interface engine 428 may assign a value to a continuous variable corresponding to the proportion of radial slider UI element 642 that includes the darkened radial oval included within radial slider UI element 642. In some examples, user interface engine 428 may make such a determination based on information from gesture detector 424 interpreting radial movement of hand 132 when hand 132 is configured in a pinching configuration. In the example of FIG. 8B, counterclockwise radial movements of hand 132 correspond to increasing values of an input variable. Although radial item picker UI element 632 is configured to represent a continuous input value, in other examples, radial item picker UI element 632 may configured to represent discrete values, such as discrete input values that increase as hand 132 is moved in a counterclockwise motion (or in another motion).

Figure 8C:
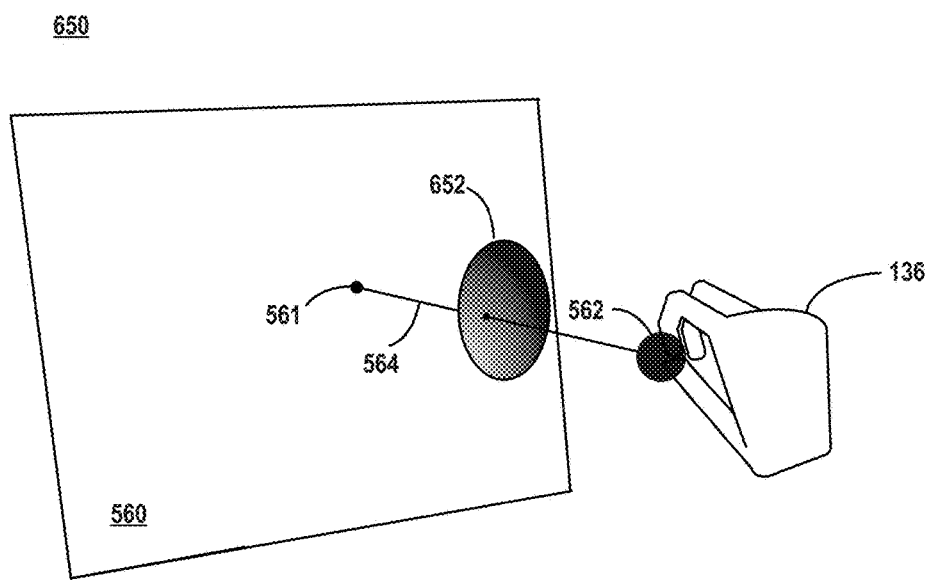
FIG. 8C illustrates artificial reality content including an example color picker UI element, in accordance with one or more aspects of the present disclosure.

FIG. 8C illustrates artificial reality content including an example color picker UI input element, in accordance with one or more aspects of the present disclosure. In the example of FIG. 8C, user interface engine 428 may assign a value to a continuous variable corresponding to a point within a two-dimensional spectrum of colors or values or represented by the color spectrum or grayscale spectrum included within color picker UI element 652. In FIG. 8C, each point within color picker UI element 652 may represent an input value within a continuum of possible values within the spectrum within color picker UI element 652. User interface engine 428 may translate movements of hand 132 into different positions within the continuum of values within color picker UI element 652, where the position is determined by the intersection of UI string element 564 and color picker UI element 652. Since movements of hand 132 translate into movements of UI pinch element 562 and therefore UI string element 564, movements of hand 132 also translate into different points within color picket UI element 652. A user may select one of the points within the spectrum included within color picker UI element 652 by terminating the pinch and pull gesture.

Figure 9A:
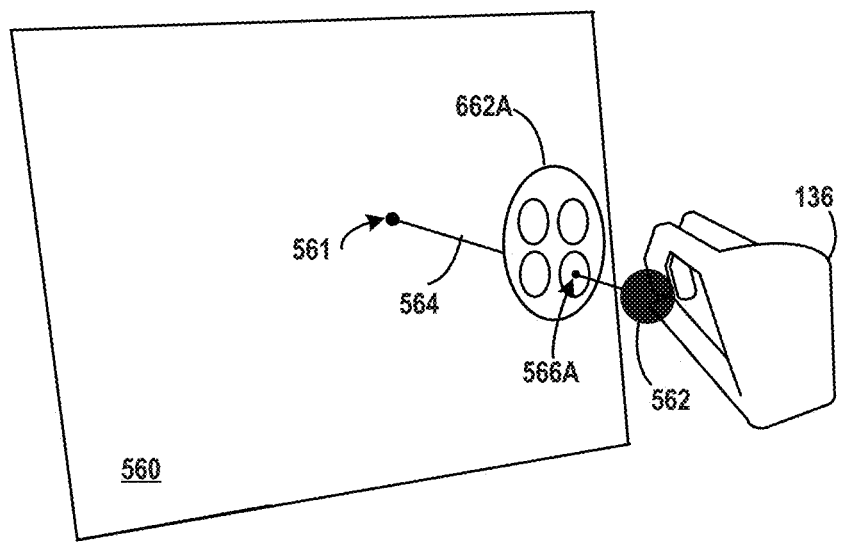
FIG. 9A, FIG. 9B, and FIG. 9C illustrate a sequence of artificial reality content that includes example radial item picker UI elements presented at a display in response to a pinch and pull gesture performed by a user, in accordance with one or more aspects of the present disclosure.
Figure 9B:
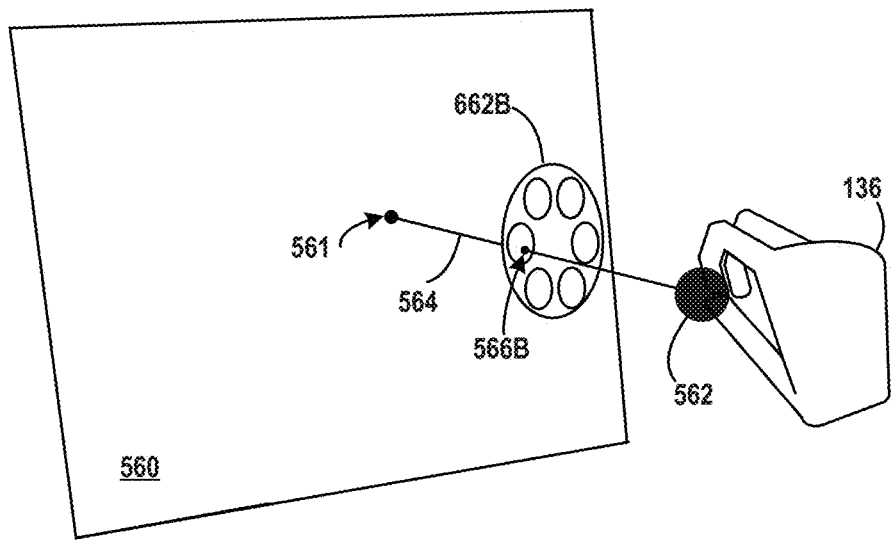
Figure 9C:
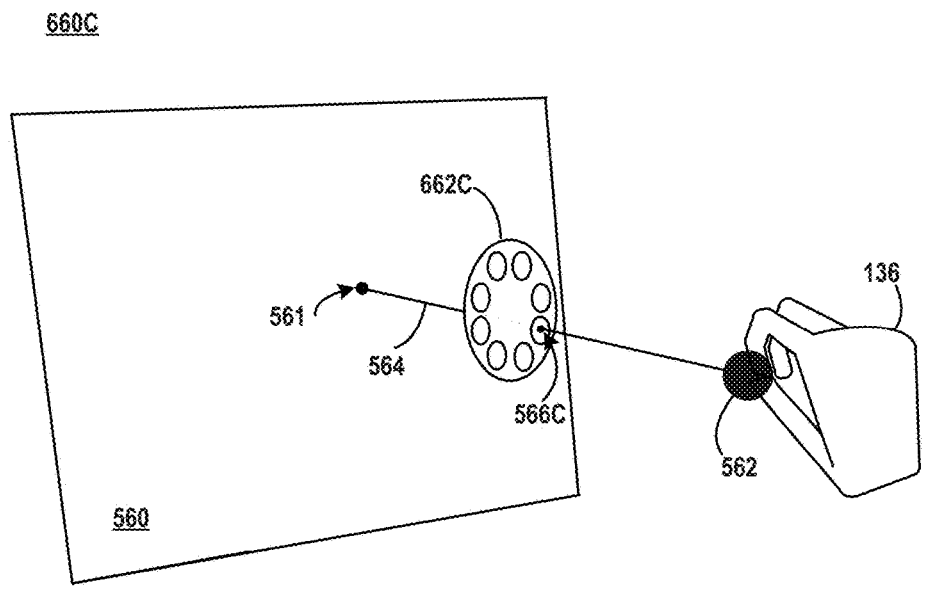

FIG. 9A, FIG. 9B, and FIG. 9C illustrate a sequence of artificial reality content that includes an example radial item picker UI input element presented at a display in response to a pinch and pull gesture performed by a user of HMD 112, in accordance with one or more aspects of the present disclosure. FIG. 9A, FIG. 9B, and FIG. 9C illustrate artificial reality content 660A, artificial reality content 660B, and artificial reality content 660C, respectively. Each instance of artificial reality content 660 includes UI string element 564 and virtual hand 136 after a pinch and pull gesture has been recognized. Also included in each case is an example radial item picker UI element 622, where menu items change based on the position of hand 132.

In the example of 9A, and in accordance with one or more aspects of the present disclosure, HMD 112 may present radial item picker UI element 662A within artificial reality content 660A, which may be used for selecting one of four input options, represented by the four ovals illustrated in FIG. 9A. For instance, with reference to FIG. 4, gesture detector 424 detects a pinching configuration of hand 132 in the vicinity of UI pinch element default position 561, followed by a pulling motion of hand 132. Gesture detector 424 determines that the movement of hand 132 corresponds to a pinch and pull gesture. Rendering engine 422 constructs artificial reality content 660A including radial item picker UI element 662A. Rendering engine 422 causes application engine 440 to output artificial reality content 660A for display and/or presentation in the manner illustrated in FIG. 9A. Artificial reality content 660A may be presented at a display within HMD 112, for example, such as display 203 illustrated in FIG. 2.

FIG. 9B illustrates an example of an updated radial item picker UI element that may be presented by HMD 112 in response to further movement of hand 132. For instance, with reference to FIG. 9A and FIG. 4, gesture detector 424 detects further input that gesture detector 424 determines corresponds to a further pulling motion, moving hand 132 further away from UI pinch element default position 561. Gesture detector 424 outputs information about the motion of hand 132 to user interface engine 428. User interface engine 428 increases, based on the position of hand 132, the granularity of radial item picker UI element 662A. User interface engine 428 outputs information to rendering engine 422. Rendering engine 422 updates artificial reality content 660A to generate artificial reality content 660B. Rendering engine 422 causes application engine 440 to output artificial reality content 660B for in the manner illustrated in FIG. 9B. In FIG. 9B, artificial reality content 660B includes updated radial item picker UI element 662B, which has more selectable display elements than radial item picker UI element 662A illustrated in FIG. 9A.

FIG. 9C illustrates an example of a further updated radial item picker UI element that may be presented by HMD 112 in response to still further movement of hand 132. For instance, with reference to FIG. 9B and FIG. 4, gesture detector 424 detects further input that gesture detector 424 determines corresponds to a continuation of the pulling motion illustrated in FIG. 9A and FIG. 9B. User interface engine 428 determines that, based on the position of hand 132, the granularity of radial item picker UI element 662B should be further increased. Rendering engine 422 updates artificial reality content 660B to generate artificial reality content 660C. Rendering engine 422 causes application engine 440 to output artificial reality content 660C for display in the manner illustrated in FIG. 9C. In FIG. 9C, artificial reality content 660C includes radial item picker UI element 662C, which has more selectable display elements than radial item picker UI element 662A or radial item picker UI element 662B.

In the example of FIG. 9A, FIG. 9B, and FIG. 9C, as the user pulls hand 132 further away from UI pinch element default position 561, the granularity of radial item picker UI elements 662 is increased. Since UI string element 564 lengthens while the user pulls hand 132 further away from UI pinch element default position 561 and in each case, radial item picker UI element 662 remains stationary when hand 132 is pulled further away, movements of hand 132 tend to translate into progressively smaller movements of intersection point 566. For instance, with reference to FIG. 9B and FIG. 9C, as hand 132 is moved, intersection point 566C in FIG. 9C moves less than intersection point 566B in FIG. 9B, since the length of UI string element 564 results in a smaller angle at UI pinch element default position 561 between two lines formed by different UI string elements 564 to different positions of hand 132. In other words, if hand 132 in FIG. 9B is moved eight inches, that movement may result in intersection point 566B moving one inch. However, if hand 132 in FIG. 9C is moved eight inches, that movement would likely result in intersection point 566C moving less than one inch, since hand 132 in FIG. 9C is further away from UI pinch element default position 561 than in FIG. 9B. Accordingly, use of a higher-granularity radial item picker UI may be appropriate as hand 132 is moved further away from UI pinch element default position 561 (e.g., as in FIG. 9C), since movements of hand 132 result in finer movements of intersection point 566C. A user performing the hand movements might not perceive any additional difficulty in performing the finer movements required by radial item picker UI element 662C as compared to radial item picker UI element 662B.

Figure 10:
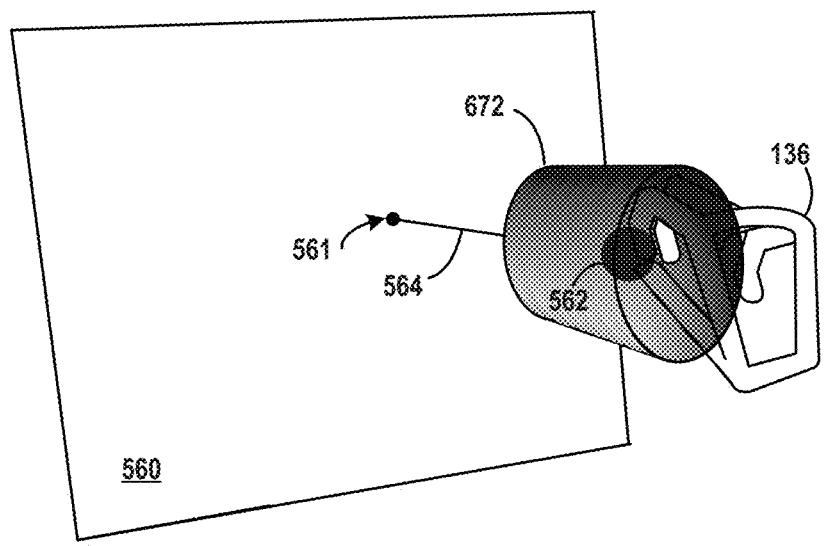
FIG. 10 is a conceptual diagram illustrating artificial reality content including an example volumetric color picker UI element, in accordance with one or more aspects of the present disclosure.

FIG. 10 is an illustration of example artificial reality content including an example volumetric color picker UI input element 672, in accordance with one or more aspects of the present disclosure. In the example of FIG. 10, HMD 112 may present volumetric color picker UI element 672. For instance, with reference to FIG. 4, user interface engine 428 generates volumetric color picker UI element 672 in response to a gating or triggering gesture identified by gesture detector 424, such as a pinch and pull gesture. Rendering engine 422 constructs artificial reality content 670 including volumetric color picker UI element 672. Rendering engine 422 causes application engine 440 to output artificial reality content 670 for display and/or presentation in the manner illustrated in FIG. 10.

HMD 112 may translate movement of hand 132 into an input variable using volumetric color picker UI element 672. For instance, with reference to FIG. 4 and FIG. 10, user interface engine 428 may determine, based on information detected by gesture detector 424, a position of UI pinch element 562 within volumetric color picker UI element 672. User interface engine 428 may determine an input value (e.g., color) associated with the position within volumetric color picker UI element 672 of UI pinch element 562. User interface engine 428 may output information about the input value to rendering engine 422. Rendering engine 422 constructs updated artificial reality content 670. In addition, rendering engine 422 may shade or color UI pinch element 562 to correspond to the color represented by the input value associated with the position of hand 132. Volumetric color picker UI input element 672, as illustrated in FIG. 10, may differ from color picker UI element 652 in the sense that it can be used for selection of a three-dimensional value, rather than a two-dimensional value. In some examples, the three-dimensional value may represent hue, saturation, and lightness values, where the hue and saturation are defined by the intersection of the string and the lightness values set by the distance. Other implementations using three-dimensional values are possible, including examples involving RGB color values.

Figure 11:
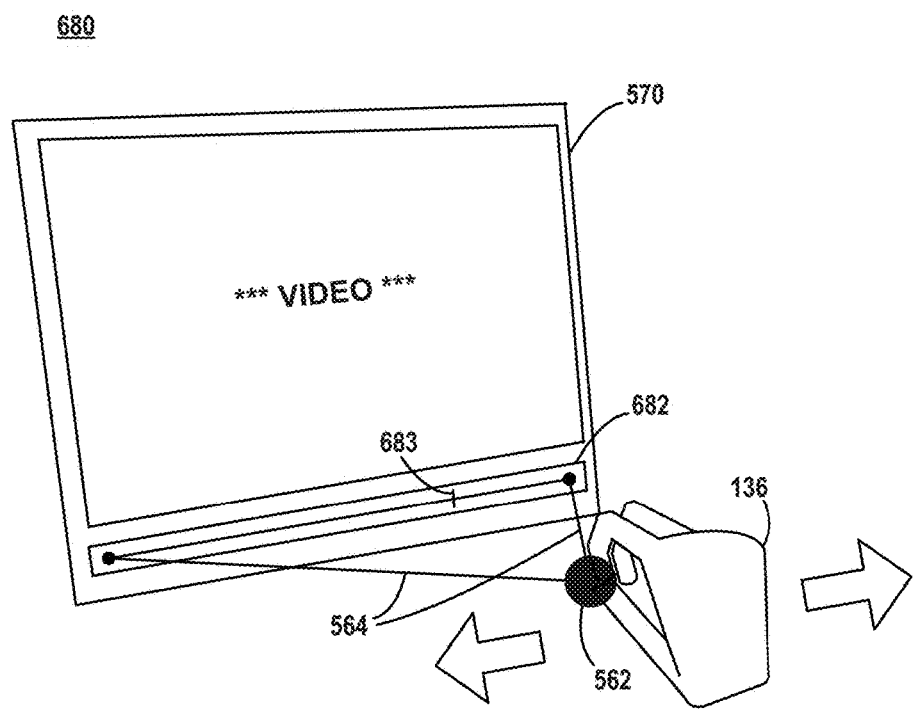
FIG. 11 is a conceptual diagram illustrating artificial reality content including an example progress slider UI element, in accordance with one or more aspects of the present disclosure.

FIG. 11 is a conceptual diagram illustrating artificial reality content including an example progress slider UI input element 682, in accordance with one or more aspects of the present disclosure. In the example of FIG. 11, HMD 112 may present progress slider UI element 682, which includes progress indicator 683. Progress slider UI element 682 may be used to represent the progress, in time, of a video clip being presented within UI panel 570. In the example of FIG. 11, progress indicator 683 can be adjusted based on movements of UI pinch element 562, which, in the example of FIG. 11, is illustrated as being attached to UI string elements 564. Gesture detector 424 and/or user interface engine 428 translate side to side movements of hand 132 into different positions of progress indicator 683. For instance, a rightward movement of hand 132 may move progress indicator 683 toward the right of progress slider UI element 682 (e.g., corresponding to a later time within a video clip). A leftward movement of hand 132 may cause progress indicator 683 to move toward the left of progress slider UI element 682 (e.g., corresponding to an earlier time within the video clip). HMD 112 may determine, upon release of the pinching configuration of hand 132, an input value corresponding to a new position of progress indicator 683.

In many of the illustrations described herein (e.g., starting with FIG. 5A and through FIG. 11), UI pinch element 562 is illustrated as a spherical shaped-object, and is generally illustrated with a consistent size. In other examples, however, UI pinch element 562 could be a different shape, and could be a different size. The characteristics of UI pinch element 562 may, in some examples provide a visual indication of the type of input that a pinch and pull gesture may enable (e.g., selectable menu items, object selection, one-dimensional discrete or continuous variable, two-dimensional variable, three-dimensional volumetric variable, or otherwise). In other examples, text adjacent to the UI pinch element 562 (e.g., on UI panel 560) may alternatively, or in addition, indicate the type of input that a pinch and pull gesture may enable.

Figure 12A:
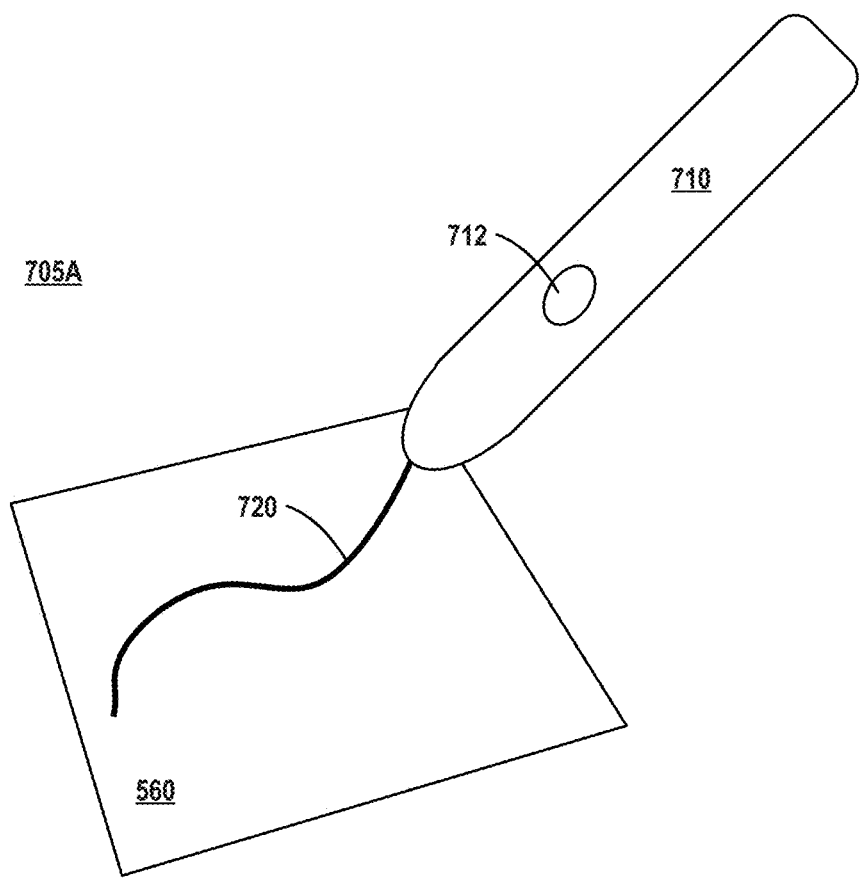
FIG. 12A, FIG. 12B, and FIG. 12C illustrate a sequence of artificial reality content involving an example physical stylus, in accordance with one or more aspects of the present disclosure.
Figure 12B:
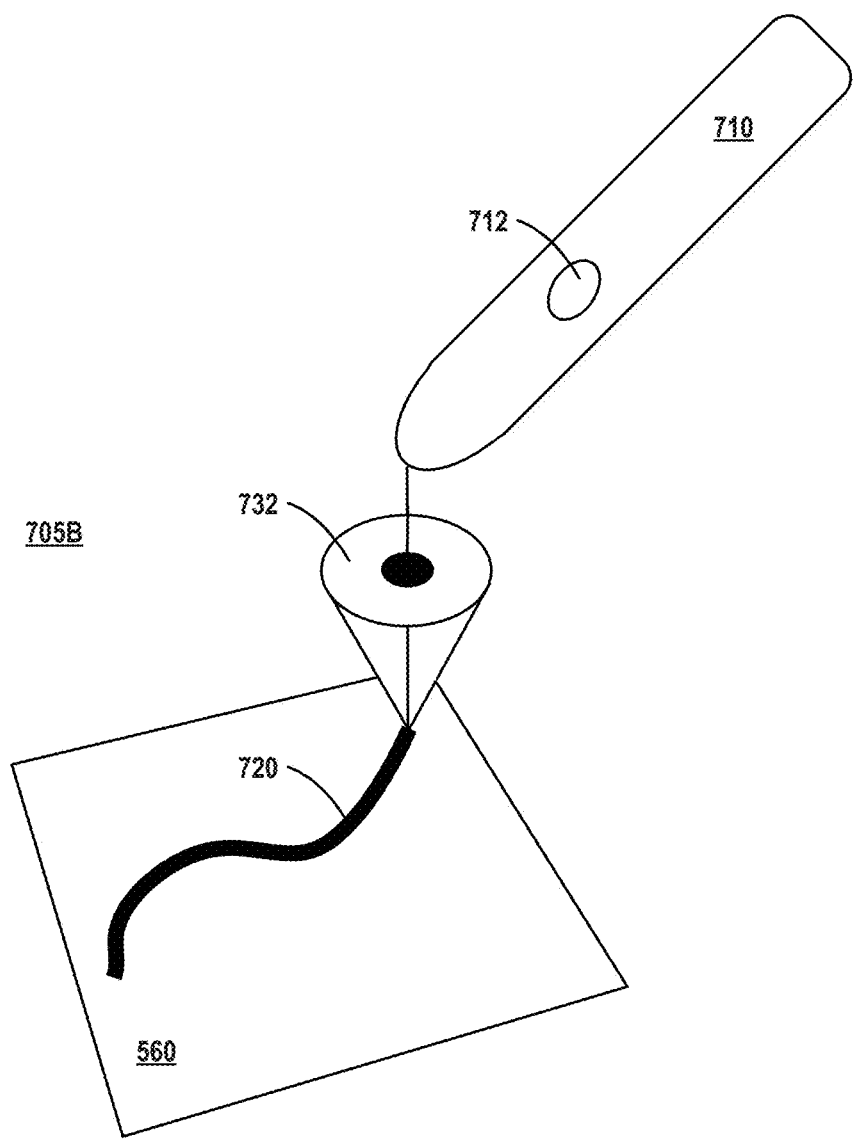
Figure 12C:
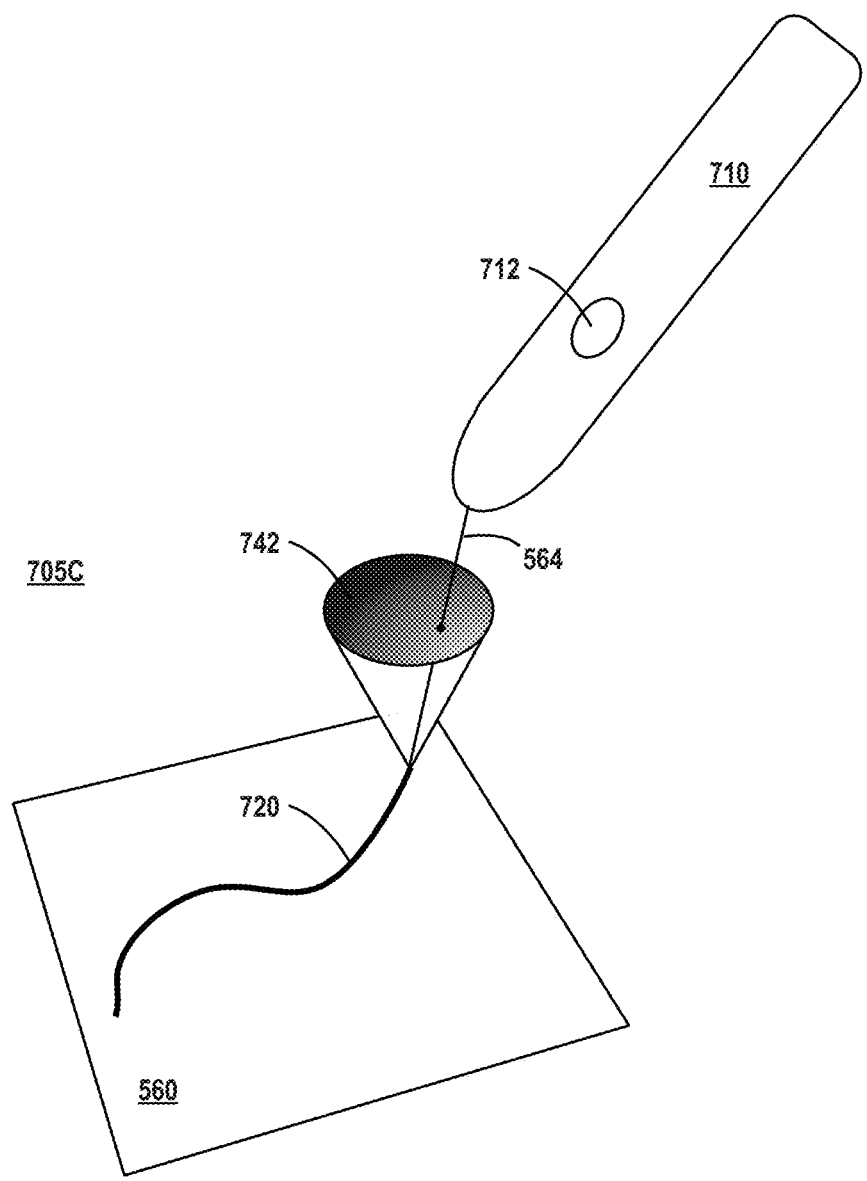

FIG. 12A, FIG. 12B, and FIG. 12C illustrate a sequence of artificial reality content involving an example physical stylus, in accordance with one or more aspects of the present disclosure. FIG. 12A, FIG. 12B, and FIG. 12C illustrate artificial reality content 705A, artificial reality content 705B, and artificial reality content 705C, respectively. In the examples shown, each instance of artificial reality content includes physical stylus 710. Physical stylus 710 includes physical button 712. Physical stylus 710 may normally be controlled and/or held by a hand of a user, which may be represented within the artificial reality content illustrated in FIG. 12A, FIG. 12B, and FIG. 12C. However, for ease of illustration and clarity, a hand is not shown in FIG. 12A, FIG. 12B, and FIG. 12C.

Each of artificial reality content 705A, artificial reality content 705B, and artificial reality content 705C may be presented by an example HMD 112, such as that illustrated in FIG. 1A and/or FIG. 1B. Although FIG. 12A, FIG. 12B, and FIG. 12C are described in the context of using a physical stylus 710 with physical button 712, in other examples, similar techniques might be employed using a virtual stylus, based on a gesture or a recognized configuration of a hand.

In the example of FIG. 12A, an in accordance with one or more aspects of the present disclosure, HMD 112 may present artificial reality content 705A. For instance, with reference to an example that can be described in the context of FIG. 4, pose tracker 426 detects movement information and data, such as from sensors 90. Pose tracker 426 outputs pose information to rendering engine 422, and rendering engine 422 constructs an initial version of artificial reality content 705A based the detected input and based on a viewing perspective of artificial reality content 122, as determined by pose tracker 426. Pose tracker 426 detects further movement information, and determines that the movement corresponds to physical stylus 710 being moved along UI panel 560. Pose tracker 426 outputs information to rendering engine 422, and rendering engine 422 constructs artificial reality content 705A. Rendering engine 422 includes within artificial reality content 705A line 720. Line 720 may correspond to the movement of physical stylus 710 along UI panel 560. Rendering engine 422 causes application engine 440 to output artificial reality content 705A for display and/or presentation in the manner illustrated in FIG. 12A.

FIG. 12B illustrates an example line thickness UI element that may be presented by HMD 112 in response to an action performed on physical stylus 710. For instance, with reference to FIG. 4 and FIG. 12A, user interface engine 428 detects input corresponding to a user selecting physical button 712, holding physical button 712 down, and pulling physical stylus 710 in an upward motion away from UI panel 560. (In some examples, this may correspond to the pinch and pull gesture described in earlier figures.) User interface engine 428 may detect such input based on images from one or more of image capture device 138, cameras 102, and/or sensors 90, based on a wireless signal initiated by physical stylus 710 in response to selection of physical button 712, and/or in another manner. User interface engine 428 determines, based on the input, that interactions with and movement of physical stylus 710 correspond to an action that gates or triggers display of line thickness UI element 732. User interface engine 428 outputs information about the action to rendering engine 422. Rendering engine 422 updates artificial reality content 705A to generate artificial reality content 705B, reflecting movement of physical stylus 710 and display of line thickness UI element 732. Rendering engine 422 causes application engine 440 to present artificial reality content 705B in the manner illustrated in FIG. 12B.

User interface engine 428 may detect further movement of physical stylus 710, which may cause modifications to the width of line 720 in artificial reality content 705B. For instance, again referring to FIG. 12B, user interface engine 428 may detect that while physical button 712 continues to be depressed, physical stylus 710 has been moved further from UI panel 560. In response, rendering engine 422 may cause line 720 to be redrawn with a thicker line. Similarly, user interface engine 428 may detect that physical stylus 710 has been moved closer to UI panel 560 (with physical button 712 depressed), and in response, rendering engine 422 may cause line 720 to be drawn with a thinner line. User interface engine 428 may detect that physical button 712 has been released, which may terminate interaction with line thickness UI element 732. In response, user interface engine 428 may identify a selected thickness of line 720, which may be the thickness corresponding to the state of line thickness UI element 732 when physical button 712 is released. Rendering engine 422 may apply the selected thickness to line 720, and remove line thickness UI element 732 from artificial reality content 705B. Thereafter (e.g., after button 712 is released), and until a user interface gating gesture is detected, further movements of physical stylus 710 generally would not affect the thickness of line 720.

FIG. 12C illustrates an example color picker UI element that may be presented by HMD 112 in response to an action performed on physical stylus 710. For instance, referring again to FIG. 12A, user interface engine 428 detects input corresponding to a user selecting physical button 712, and pulling physical stylus 710 in an upward motion away from UI panel 560. User interface engine 428 determines that the motion and interaction with physical stylus 710 is sufficient to trigger display of color picker UI element 742. User interface engine 428 outputs information about the input rendering engine 422. Rendering engine 422 updates artificial reality content 705A to generate artificial reality content 705C, reflecting movement of physical stylus 710 and display of color picker UI element 742. Rendering engine 422 causes application engine 440 to present artificial reality content 705C in the manner illustrated in FIG. 12C.

User interface engine 428 may detect further movement of physical stylus 710, which may cause modifications to the color or shading of line 720. For instance, with reference to FIG. 12C, user interface engine 428 may detect that while physical button 712 continues to be depressed, physical stylus 710 has been moved within the space above UI panel 560, and in response, user interface engine 428 may determine that UI string element 564 intersects color picker UI element 742 at a different location. User interface engine 428 identifies a color corresponding to the intersection of UI string element 564. User interface engine 428 outputs information about the identified color to rendering engine 422. Rendering engine 422 updates artificial reality content 705C to reflect the identified color by drawing line 720 using the identified color. Rendering engine 422 causes application engine 440 to update artificial reality content 705C within display 203.

User interface engine 428 may eventually detect that physical button 712 has been released. User interface engine 428 may recognize such an action as a user's request to terminate interaction with color picker UI element 742 and apply the current color to line 720. In response, user interface engine 428 may apply the selected color to line 720, and remove color picker UI element 742 from artificial reality content 705C.

In both FIG. 12B and FIG. 12C, physical stylus 710 is shown positioned above line thickness UI element 732 and color picker UI element 742, respectively. In each example, UI input elements 732 and 742 may operate in response to movements of physical stylus 710 in a manner similar to those described herein with respect to a pinch and pull gesture. In other words, physical stylus 710 may be used to trigger any of the same UI input elements described herein as being triggered by a pinch and pull gesture. In the examples of FIG. 12B and FIG. 12C, however, such UI input elements are triggered by interaction with physical stylus 710 (e.g., pressing physical button 712 and a subsequent movement of physical stylus 710). Accordingly, while FIG. 12B and FIG. 12C are shown as examples, any of the other UI input elements described herein in connection with the pinch and pull gesture involving hand 132 may be alternatively gated by an action of physical stylus 710. In such examples, those UI input elements may operate in response to corresponding movements of physical stylus 710.

Further, although selection of or pressing button 712 is described as part of the action triggering display of UI input elements, in other examples, such UI input elements may be triggered in another way by stylus 710, such as by applying sufficient pressure by stylus 710 to a surface beneath stylus 710. In such an example, stylus 710 may recognize the pressure being applied by the user, and respond in a manner similar to that described above when button 712 is pressed.

Figure 13A:
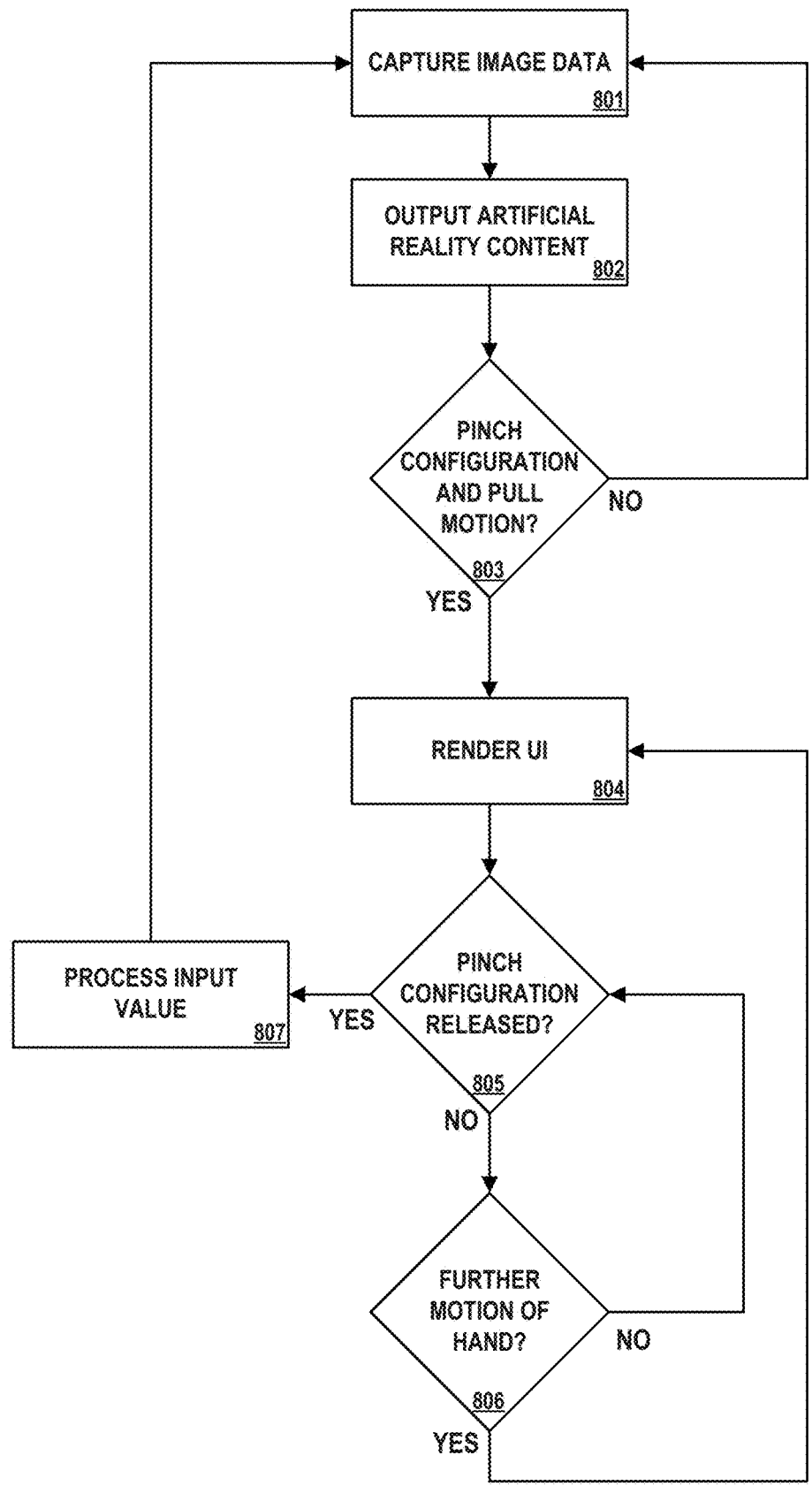
FIG. 13A is a flow diagram illustrating operations performed by an example artificial reality system, in accordance with one or more aspects of the present disclosure.

FIG. 13A is a flow diagram illustrating operations performed by an example artificial reality system, in accordance with one or more aspects of the present disclosure. FIG. 13A is described below within the context of artificial reality system 10 of FIG. 1A. In other examples, operations described in FIG. 13A may be performed by one or more other components, modules, systems, or devices. Further, in other examples, operations described in connection with FIG. 13 may be merged, performed in a difference sequence, omitted, or may encompass additional operations not specifically illustrated or described.

In the process illustrated in FIG. 13A, and in accordance with one or more aspects of the present disclosure, artificial reality system 10 may capture image data (801). For example, with reference to FIG. 1A, one or more image capture devices 138 included within HMD 112 (or other devices) may capture images within field of view 130 that are representative of a physical environment near a user wearing HMD 112.

Artificial reality system 10 may output artificial reality content (802). For example, with reference to FIG. 1A, HMD 112 may present, at a display included within HMD 112, artificial reality content. Such content may include images of the physical environment, artificial content overlaid on the images of the physical environment, user interface elements (e.g., menus), or other content.

Artificial reality system 10 may identify, from the image data, a gesture comprising a pinch configuration and pull motion (803). For example, again referring to FIG. 1A, HMD 112 may analyze image data captured by one or more image capture devices 138 and identify, based on the image data, a gesture comprising a motion of two fingers from hand 132 to form a pinching configuration and a subsequent pulling motion while hand 132 is in the pinching configuration. HMD 112 may determine that the pinching configuration of hand 132 is held in that configuration for a sufficient amount of time, before or during the pulling motion. HMD 112 may further determine that the pulling motion is of sufficient length to qualify, when combined with the pinching configuration, as a pinch and pull gesture as described, for example, in connection with FIG. 5A, FIG. 5B, and FIG. 5C (yes path from 803).

Artificial reality system 10 may render a user interface in response to identifying the pinch and pull configuration (804). For example, referring again to FIG. 1A, HMD 112 generates artificial reality content, where generating the artificial reality content includes generating a user interface element. HMD 112 presents and/or renders the artificial reality content at a display included within HMD 112. The artificial reality content may include a user interface element overlaid on images of the physical environment. In some examples, the user interface element included within the artificial reality content may be a one-dimensional slider UI element, such as that illustrated in FIG. 6A, FIG. 6B, and FIG. 6C. However, the rendered user interface element could be any other appropriate user interface element, including, but not limited to, any of the user interface elements described in this disclosure (e.g., including those described as being gated or triggered by a pinch and pull gesture or otherwise).

Artificial reality system 10 may determine that the pinch configuration has not yet been released (no path from 805). For example, in FIG. 1A, HMD 112 may continue to analyze image data captured by one or more of image capture devices 138 and determine, based on the image data, that hand 132 continues to be in a pinching configuration.

Artificial reality system 10 may identify further motion of hand 132 (yes path from 806). For example, in FIG. 1A, HMD 112 may identify, based on captured image data, further motion of hand 132 while hand 132 is in a pinching configuration. In response to the further motion, HMD 112 may update the content presented at the display included within HMD 112. In particular, HMD 112 may update the user interface element included within the artificial reality content. In an example where the user interface element is a one-dimensional slider similar to that illustrated in connection with FIG. 6A, FIG. 6B, and FIG. 6C, HMD 112 may update the user interface to correspond with movement of hand 132. In such an example, HMD 112 may, in response to a further pulling motion, increase the size of circle 613 associated with one-dimensional slider UI element 612 (see FIG. 6C) to correspond to an increased one-dimensional input value represented by the user interface element.

Artificial reality system 10 may determine that the pinch configuration has been released (yes path from 805) and process an input value (807). For example, in FIG. 1A, HMD 112 may continue to analyze image data captured by one or more of image capture devices 138 and determine, based on the image data, that hand 132 is no longer in the pinching configuration. HMD 112 may determine the last input value represented by the user interface element when hand 132 was in the pinching configuration. HMD 112 may identify the last input value as the user's selected input value. HMD 112 may process the user's selected input value by, for example, affecting the environment using the input value. In some examples, the input value may correspond to an audio volume level, so adjustments to the selected input value may have the effect of increasing audio volume of sounds being presented by artificial reality system 10.

Figure 13B:
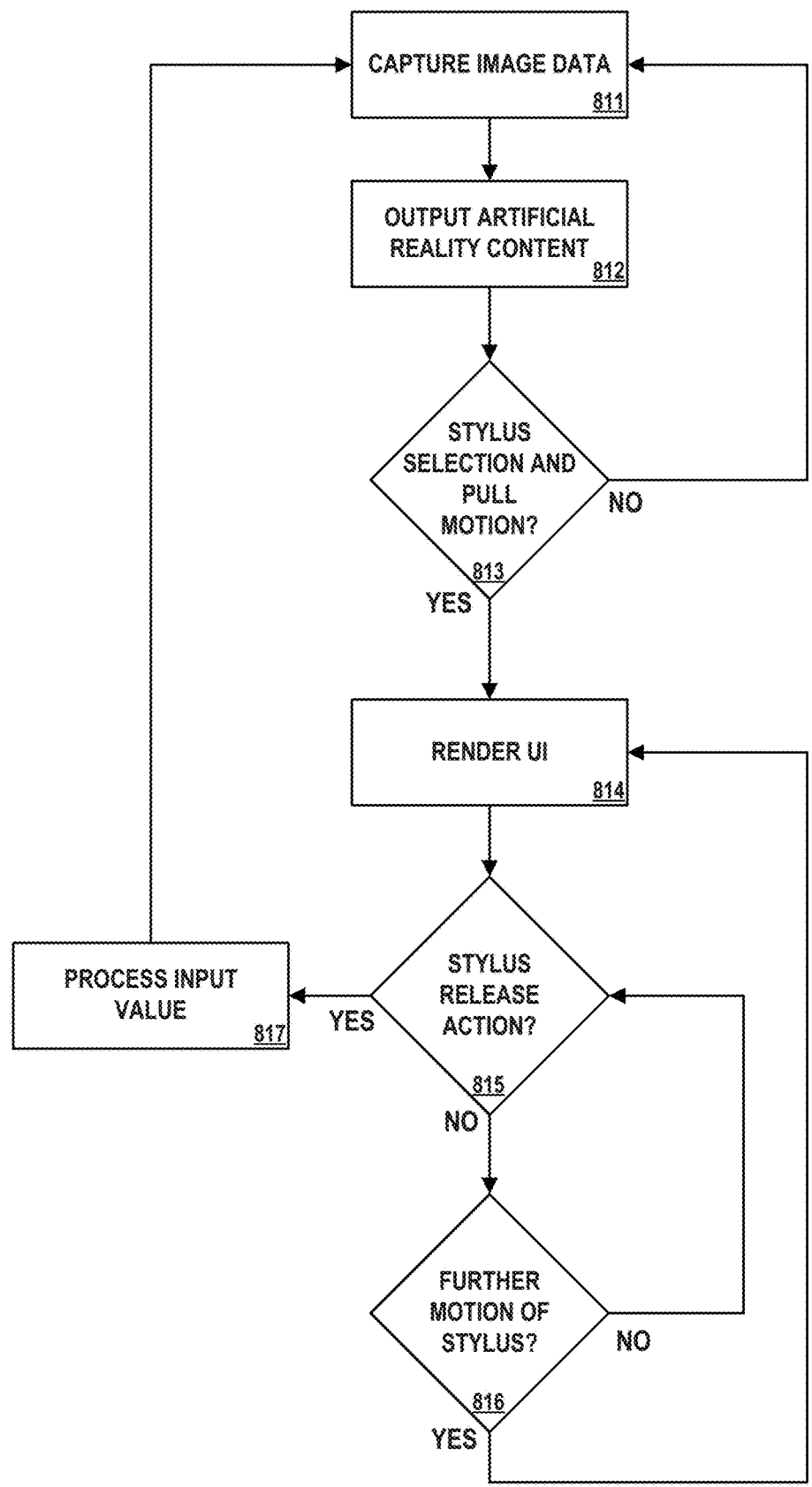
FIG. 13B is a flow diagram illustrating operations performed by an example artificial reality system using a physical stylus, in accordance with one or more aspects of the present disclosure.

FIG. 13B is a flow diagram illustrating operations performed by an example artificial reality system using a physical stylus, in accordance with one or more aspects of the present disclosure. FIG. 13B is described below within the context of artificial reality system 10 of FIG. 1A, and FIG. 12A and FIG. 12B. In other examples, operations described in FIG. 13B may be performed by one or more other components, modules, systems, or devices. Further, in other examples, operations described in connection with FIG. 13 may be merged, performed in a difference sequence, omitted, or may encompass additional operations not specifically illustrated or described.

In the process illustrated in FIG. 13B, and in accordance with one or more aspects of the present disclosure, artificial reality system 10 may capture image data (811). For example, with reference to FIG. 1A, one or more image capture devices 138 included within HMD 112 may capture images within field of view 130 that are representative of a physical environment near a user wearing HMD 112.

Artificial reality system 10 may output artificial reality content (812). For example, with reference to FIG. 1A and FIG. 12A, HMD 112 may present, at a display included within HMD 112, artificial reality content. Such content may include images of the physical environment. Such content may also include artificial content overlaid on the images of the physical environment, such as lines or other content generated in response to movement of physical stylus 710 of FIG. 12A. In addition, user interface elements (e.g., menus) and/or other content may also be overlaid on the images of the physical environment.

Artificial reality system 10 may identify a stylus selection and pull motion (813). For example, with reference to FIG. 12A, HMD 112 may analyze image data captured by one or more image capture devices 138 and identify, based on the image data, movement of physical stylus 710. HMD 112 may also detect a signal from physical stylus 710 that HMD 112 determines corresponds to an indication that physical button 712 on physical stylus 710 has been depressed. HMD 112 may further detect, based on the image data, a subsequent pulling motion of physical stylus 710 while physical button 712 is depressed. HMD 112 may determine that the selection of physical button 712 followed by the subsequent pulling motion qualifies as stylus selection and pull motion (yes path from 813).

Artificial reality system 10 may render a user interface in response to identifying the stylus selection and pull motion (814). For example, referring again to FIG. 12A, HMD 112 generates artificial reality content, which may include line 720 being drawn on UI panel 560. HMD 112 may also include within the artificial reality content a user interface element, such as line thickness UI element 732 as illustrated in FIG. 12B. HMD 112 presents and/or renders the artificial reality content at a display included within HMD 112. HMD 112 includes line thickness UI element 732 within the artificial reality content, although in other examples any other appropriate user interface element may be included within the alternative reality content in response to the stylus selection and pull motion, including, but not limited to, any of the user interface elements described in this disclosure as being gated or triggered by a stylus selection action or a pinch and pull gesture of hand 132.

Artificial reality system 10 may determine that a stylus release action has not yet occurred (no path from 815). For example, in FIG. 1A, HMD 112 may determine, based on image data or communications from physical stylus 710, that physical button 712 continues to be depressed.

Artificial reality system 10 may identify further motion of physical stylus 710 (yes path from 816). For example, in FIG. 1A, HMD 112 may identify, based on captured image data, further motion of physical stylus 710 while physical button 712 is depressed. In response to the further motion, HMD 112 may update the content presented at the display included within HMD 112. In particular, HMD 112 may update line thickness UI element 732 based on the movement. In some examples, and as illustrated in FIG. 12B, HMD 112 may cause the thickness of line 720 to be increased when physical stylus 710 is pulled further away from UI panel 560. HMD 112 may cause the thickness of line 720 to be decreased when physical stylus 710 is brought closer to UI panel 560.

Artificial reality system 10 may determine that a stylus release action has occurred (yes path of 815) and process an input value (817). For example, in FIG. 1A, HMD 112 may detect that physical button 712 has been released. HMD 112 determines the last input value represented by line thickness UI element 732 before physical button 712 was released. HMD 112 identifies the last input value as the user's selected input value. HMD 112 processes the user's selected input value by, for example, storing the thickness of line 720 and updating the presented artificial reality content so that line 720 continues to be presented with the selected thickness.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. An artificial reality system comprising:
a head-mounted display (HMD) configured to output artificial reality content;
a stylus;
processing circuitry implementing a stylus action detector configured to:
detect movement of the stylus,
detect a stylus selection action, and
after detecting the stylus selection action, detect further movement of the stylus in three-dimensional space;
a user interface (UI) engine configured to:
generate stylus movement content in response to the movement of the stylus, and
generate a UI input element in response to the stylus selection action; and
a rendering engine configured to:
render the stylus movement content as an overlay on at least some of the artificial reality content,
render the UI input element in three-dimensional space between the stylus and the stylus movement content, wherein the UI input element includes a UI string element extending from the stylus to the stylus movement content and intersecting the UI input element in three-dimensional space,
update the stylus movement content based on the further movement of the stylus in three-dimensional space, and
update the position of the UI string element as the further movement of the stylus occurs to show, based on a change in the intersection of the UI string element with the UI input element in three-dimensional space between the stylus and the stylus movement content, how the further movement of the stylus in three-dimensional space translates into modification of the stylus movement content.

2. The artificial reality system of claim 1, wherein the stylus movement content includes a line corresponding to the movement of the stylus, and wherein the modification to the stylus movement content is at least one of:
a change to a color of the line;
a change to a thickness of the line; or
a change to the shape of the line.

3. The artificial reality system of claim 1, wherein the artificial reality system further comprises an image capture device configured to capture image data representative of a physical environment, and wherein to detect movement of the stylus, the stylus action detector is further configured to:
identify, from the image data, the movement of the stylus.

4. The artificial reality system of claim 3, wherein to detect the stylus selection action, the stylus action detector is further configured to:
identify, from the image data, a stylus gesture.

5. The artificial reality system of claim 4, wherein to identify the stylus gesture, the stylus action detector is further configured to:
identify the stylus gesture as corresponding to an entry in a gesture library.

6. The artificial reality system of claim 1, wherein the stylus action detector is included within the stylus, and wherein to detect a stylus selection action, the stylus action detector is configured to detect at least one of:
a physical button on the stylus being pressed;
the stylus being pressed against a surface; and
a stylus gesture.

7. The artificial reality system of claim 1,
wherein the stylus action detector is further configured to detect a stylus de-selection action; and
wherein the rendering engine is further configured to remove, responsive to detection of the de-selection action, the UI input element from the artificial reality content.

8. A method comprising:
outputting artificial reality content;
detecting movement of a stylus;
detecting a stylus selection action;
after detecting the stylus selection action, detecting further movement of the stylus in three-dimensional space;
generating stylus movement content in response to detecting the movement of the stylus;
generating a UI input element in response to detecting the stylus selection action;
rendering the stylus movement content as an overlay on at least some of the artificial reality content;
rendering the UI input element in three-dimensional space between the stylus and the stylus movement content, wherein the UI input element includes a UI string element extending from the stylus to the stylus movement content and intersecting the UI input element in three-dimensional space;
updating the stylus movement content based on the further movement of the stylus in three-dimensional space; and
updating the position of the UI string element as to the further movement of the stylus occurs to show, based on a change in the intersection of the UI string element with the UI input element in three-dimensional space between the stylus and the stylus movement content, how the further movement of the stylus in three-dimensional space translates into modification of the stylus movement content.

9. The method of claim 8, wherein the stylus movement content includes a line corresponding to the movement of the stylus, and wherein updating the stylus movement content includes at least one of:
   a change to a color of the line;
   a change to a thickness of the line; or
   a change to the shape of the line.

10. The method of claim 9, further comprising:
    capturing image data representative of a physical environment; and
    wherein detecting movement of the stylus includes identifying, from the image data, the movement of the stylus.

11. The method of claim 10, wherein detecting the stylus selection action includes:
    identifying, from the image data, a stylus gesture.

12. The method of claim 11, wherein identifying the stylus gesture includes:
    identifying the stylus gesture as corresponding to an entry in a gesture library.

13. The method of claim 8, wherein detecting a stylus selection action includes detecting at least one of:
    a physical button on the stylus being pressed;
    the stylus being pressed against a surface; and
    a stylus gesture.

14. The method of claim 8, further comprising:
    detecting a stylus de-selection action; and
    removing, responsive to detection of the de-selection action, the UI input element from the artificial reality content.

15. A non-transitory computer-readable medium comprising instructions for causing one or more processors of an artificial reality system to perform operations comprising:
    outputting artificial reality content;
    detecting movement of a stylus;
    detecting a stylus selection action;
    after detecting the stylus selection action, detecting further movement of the stylus in three-dimensional space;
    generating stylus movement content in response to detecting the movement of the stylus;
    generating a UI input element in response to detecting the stylus selection action;
    rendering the stylus movement content as an overlay on at least some of the artificial reality content;
    rendering the UI input element in three-dimensional space between the stylus and the stylus movement content, wherein the UI input element includes a UI string element extending from the stylus to the stylus movement content and intersecting the UI input element in three-dimensional space;
    updating the stylus movement content based on the further movement of the stylus in three-dimensional space; and
    updating the position of the UI string element as the further movement of the stylus to show, based on a change in the intersection of the UI string element with the UI input element in three-dimensional space between the stylus and the stylus movement content, how the further movement of the stylus in three-dimensional space translates into modification of the stylus movement content.

16. The non-transitory computer-readable medium of claim 15, wherein the stylus movement content includes a line corresponding to the movement of the stylus, and wherein updating the stylus movement content is at least one of:
    a change to a color of the line;
    a change to a thickness of the line; or
    a change to the shape of the line.

17. The non-transitory computer-readable medium of claim 15, further comprising:
    capturing image data representative of a physical environment; and
    wherein detecting movement of the stylus includes identifying, from the image data, the movement of the stylus.

18. The non-transitory computer-readable medium of claim 17, wherein detecting the stylus selection action includes:
    identifying, from the image data, a stylus gesture.

19. The non-transitory computer-readable medium of claim 18, wherein identifying the stylus gesture includes:
    identifying the stylus gesture as corresponding to an entry in a gesture library.

* * * * *